US012643782B2

(12) United States Patent
Torak et al.

(10) Patent No.: US 12,643,782 B2
(45) Date of Patent: Jun. 2, 2026

(54) BEVERAGE COOLER

(71) Applicant: Kraus USA Plumbing LLC, Port Washington, NY (US)

(72) Inventors: Serhiy Torak, Brooklyn, NY (US); Todd Alexander, Hollis, NH (US)

(73) Assignee: Kraus USA Plumbing LLC, Port Washington, NY (US)

( * ) Notice: Subject to any disclaimer, the term of this patent is extended or adjusted under 35 U.S.C. 154(b) by 174 days.

(21) Appl. No.: 18/545,495

(22) Filed: Dec. 19, 2023

(65) Prior Publication Data

US 2024/0228257 A1 Jul. 11, 2024

Related U.S. Application Data

(60) Provisional application No. 63/478,517, filed on Jan. 5, 2023.

(51) Int. Cl.
*B67D 1/08* (2006.01)

(52) U.S. Cl.
CPC ......... *B67D 1/0858* (2013.01); *B67D 1/0891* (2013.01)

(58) Field of Classification Search
CPC ............................ B67D 1/0891; B67D 1/0858
See application file for complete search history.

(56) References Cited

U.S. PATENT DOCUMENTS 5,417,348 A 5/1995 Perrin et al.
5,558,256 A * 9/1996 Miller .................. B67D 1/0004 222/189.09
5,984,142 A 11/1999 Castaldl
6,286,721 B1 9/2001 Pellegrini
6,298,721 B1 10/2001 Schuppe et al.
6,302,299 B1 10/2001 Baker et al.
6,394,311 B2 5/2002 McCann et al.
(Continued)

FOREIGN PATENT DOCUMENTS

CN 101539210 B 10/2012
CN 105198013 A 12/2015
(Continued)

OTHER PUBLICATIONS

EdgeStar Stainless Steel Full Size Dual Tap Kegerator with Digital Display, retrieved on Oct. 23, 2022 from https://www.kegerator.com/edgestar-full-size-dual-tap-kegerator-digital-display/KC3000TWIN.html, 15 pages.
(Continued)

*Primary Examiner* — Jeremy Carroll
(74) *Attorney, Agent, or Firm* — Bose McKinney & Evans LLP

(57) ABSTRACT

A beverage cooler that includes a housing defining an interior space adapted to hold a beverage container; a refrigeration system for cooling the interior space of the housing; and at least one opening in a sidewall panel for receiving a conveyance therethrough whereby the conveyance is connectable to the beverage container and a dispensing unit located remote from the beverage cooler. The beverage cooler may have exterior dimensions which define a width of less than 24 inches (61 cm), a front-to-back depth of less than 25 inches (63.5 cm) and a height of less than 35 inches (88.9 cm). Such dimensions would allow the beverage cooler to be installed in a standard 24 inch cabinet opening below a countertop.

21 Claims, 23 Drawing Sheets

(56) References Cited

U.S. PATENT DOCUMENTS

| | | | | |
|---|---|---|---|---|
| 7,080,525 | B2 | 7/2006 | McCann et al. | |
| 8,091,737 | B2 | 1/2012 | Smeller et al. | |
| 8,893,927 | B2 | 11/2014 | Olson et al. | |
| 9,409,758 | B2 | 8/2016 | McHale et al. | |
| 9,919,939 | B2 | 3/2018 | Rosko et al. | |
| 10,092,132 | B1 * | 10/2018 | Ryan | A47J 31/46 |
| 10,183,871 | B2 | 1/2019 | Ye | |
| 10,492,629 | B1 * | 12/2019 | Cunningham | A47F 3/0434 |
| 11,753,293 | B2 | 9/2023 | Torak et al. | |
| 2001/0040000 | A1 * | 11/2001 | Avides Moreira | B29C 65/60 156/229 |
| 2007/0028974 | A1 | 2/2007 | Herring | |
| 2013/0056495 | A1 * | 3/2013 | Watts | B67D 1/0857 222/399 |
| 2016/0214041 | A1 | 7/2016 | Miller et al. | |
| 2017/0319990 | A1 | 11/2017 | Jeon et al. | |
| 2018/0251361 | A1 | 9/2018 | Wing et al. | |
| 2018/0258621 | A1 | 9/2018 | Binay | |
| 2018/0313068 | A1 * | 11/2018 | Hirsch | E03C 1/0403 |
| 2019/0270630 | A1 | 9/2019 | Dahan et al. | |
| 2021/0276854 | A1 * | 9/2021 | Bachmann | B67D 1/0862 |
| 2023/0192468 | A1 | 6/2023 | Torak et al. | |
| 2023/0416073 | A1 | 12/2023 | Torak et al. | |
| 2024/0246806 | A1 * | 7/2024 | Snider | B67D 1/1405 |

FOREIGN PATENT DOCUMENTS

| | | | |
|---|---|---|---|
| CN | 105353690 | B | 6/2018 |
| EP | 1669322 | A1 | 6/2006 |
| GB | 2457434 | A1 | 8/2009 |
| WO | 2022023487 | A1 | 2/2022 |

OTHER PUBLICATIONS

Grohe, Chilled, Sparkling Water on Tap, retrieved on Feb. 1, 2021 from https://www.grohe.us/kitchen/design-trends/chii!ed-sparkling-water, 4 pages.

* cited by examiner

BEVERAGE COOLER

CROSS-REFERENCE TO RELATED APPLICATION

This application claims priority under 35 U.S.C. 119(e) from U.S. Provisional Patent Application Ser. No. 63/478,517, filed on Jan. 5, 2023 and entitled BEVERAGE COOLER, the disclosure of which is hereby incorporated herein by reference.

BACKGROUND

Craft beer and home brewing have become increasingly popular in recent years. Along with this rise in craft beer and home brewing, coolers specifically adapted to hold a keg or similar large container of beer or other beverage have also become more popular.

Such beer keg coolers typically include a tap or other beverage dispensing device that projects upwardly from the top surface of the cooler. The location of such taps and devices on the cooler place restraints on where the cooler can be located.

SUMMARY

The present invention provides a beverage cooler which has enhanced flexibility in the locations where it can be installed or positioned.

Disclosed herein is a beverage cooler that includes a housing defining an interior space adapted to hold a beverage container; a refrigeration system for cooling the interior space of the housing; and at least one opening in a sidewall panel for receiving a conveyance therethrough whereby the conveyance is connectable to the beverage container and a dispensing unit located remote from the beverage cooler.

In some embodiments, the beverage cooler also includes an assembly for operating a refrigeration cycle to cool the interior space. Such an assembly for operating a refrigeration cycle may include a compressor, a condenser/heat exchanger, an expansion valve and an evaporator/heat exchanger.

In some embodiments, the housing is thermally insulated. Such a housing may include three sidewall panels, a door and a top panel, each of which may be insulated. The top panel may take the form of a solid panel without any openings therethrough or have a centrally located opening with a removable plug mounted therein. The sidewalls may include a plurality of apertures with at least one of the apertures having a removable plug mounted therein.

In some embodiments, the housing is adapted to be installed under a countertop adjacent to a sink. Such an embodiment may further include a fluid dispensing system adapted to connect the beverage container within the interior space with a fluid dispenser mounted proximate the sink. The fluid dispenser may be configured to selectively dispense water from a water supply line or a beverage from the beverage container.

The beverage cooler may be adapted to house a beverage container in the form of a beer keg and the interior space may be adapted to also house a compressed gas container together with the beer keg in the interior space of the cooler. The beverage container may also be used to hold various other liquids, for example, the beverage container could be used to hold a chilled coffee beverage and the gas container could hold compressed nitrogen to thereby provide for the dispensing of nitro coffee.

In some embodiments, the beverage cooler may include an exterior support for supporting a compressed gas container outside the cooler and one of the sidewalls may include an aperture proximate the exterior support for routing a tube from the compressed gas container to the interior of the cooler where it can be coupled with the beverage container.

Advantageously, the beverage coolers disclosed herein may have exterior dimensions which define a width of less than 24 inches (61 cm), a front-to-back depth of less than 25 inches (63.5 cm) and a height of less than 35 inches (88.9 cm). Such dimensions would allow the beverage cooler to be installed in a standard 24 inch cabinet opening below a countertop. Such a beverage cooler may have a housing that includes three sidewall panels, a door and a top panel wherein the three sidewall panels define a pair of opposite side panels and a back panel wherein the width of the cooler is defined by the two opposite side panels and the depth is defined by the door in a closed position and the back panel.

Some embodiments comprise a method of installing a beverage cooler that includes positioning the beverage cooler in a cabinet opening below an existing countertop; positioning a beverage container within the cooler; and connecting the beverage container with a dispensing unit by extending a conveyance through a sidewall of the beverage cooler.

Such a method may further include positioning the dispensing unit proximate a sink. The dispensing unit in such methods may be a faucet adapted to selectively dispense water or a beverage from the beverage container. The methods may also include positioning a compressed gas container in the cooler and coupling the compressed gas container with the beverage container. In such methods, the exterior dimensions of the cooler may advantageously define a width of less than 24 inches (61 cm), a front-to-back depth of less than 25 inches (63.5 cm) and a height of less than 35 inches (88.9 cm). The coolers used for such under the countertop installations may also include an opening in their top panel with a removable plug disposed therein whereby the cooler may alternatively be employed as a free-standing unit having a dispensing unit, e.g., tap, installed on the top panel.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Figure 1:
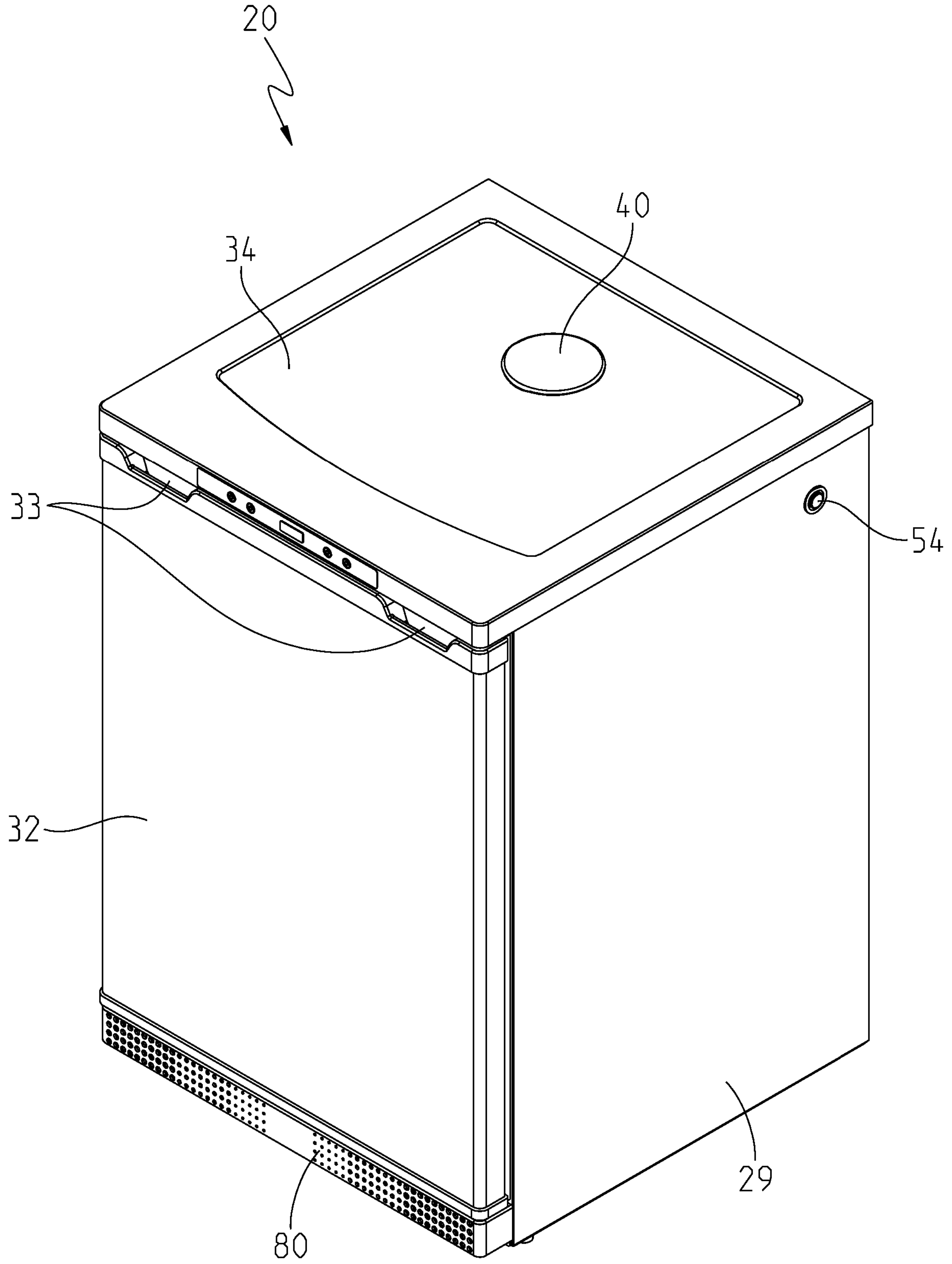
FIG. 1 is a perspective view of a beverage cooler.
Figure 2:
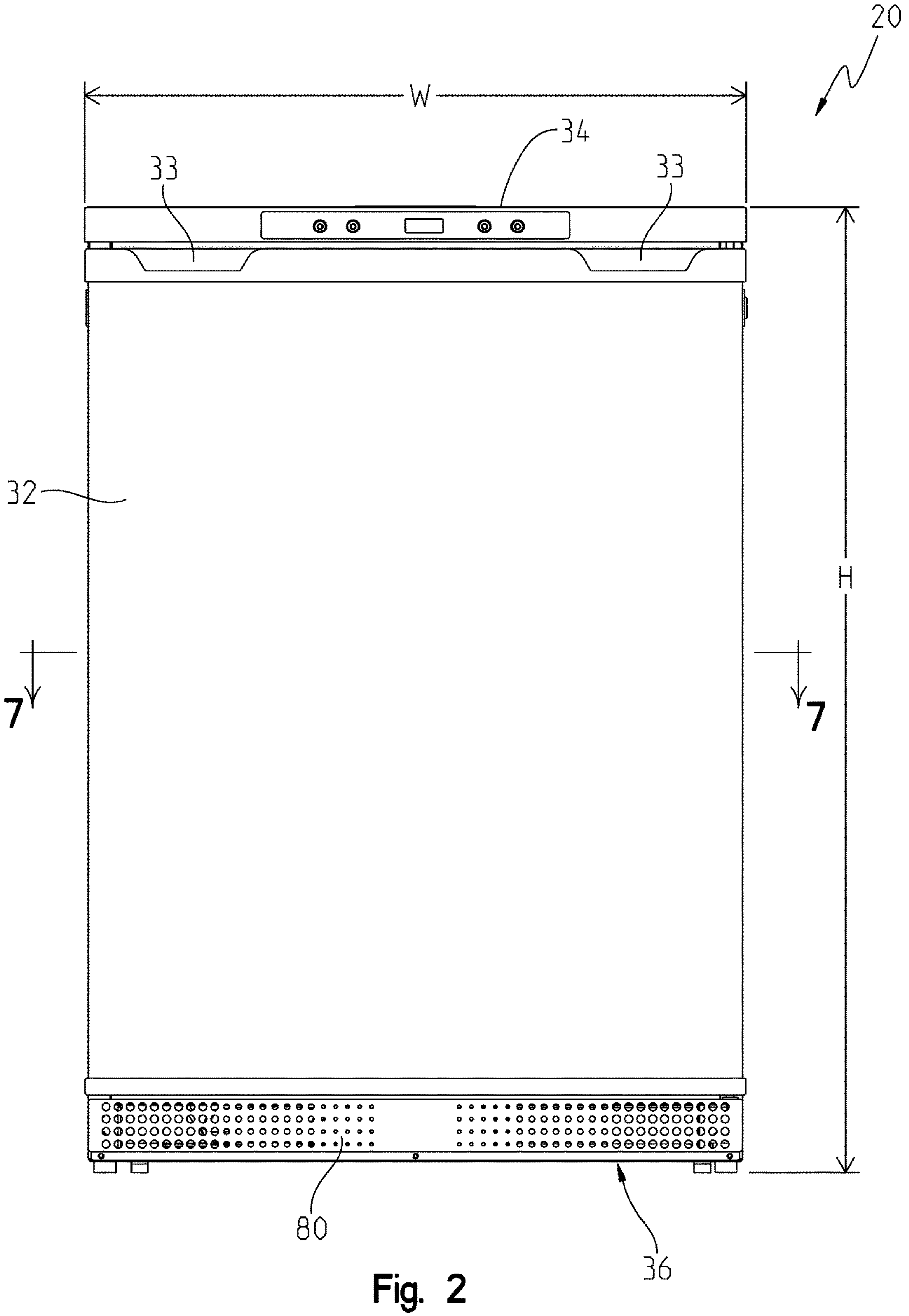
FIG. 2 is a front view of the beverage cooler.
Figure 3:
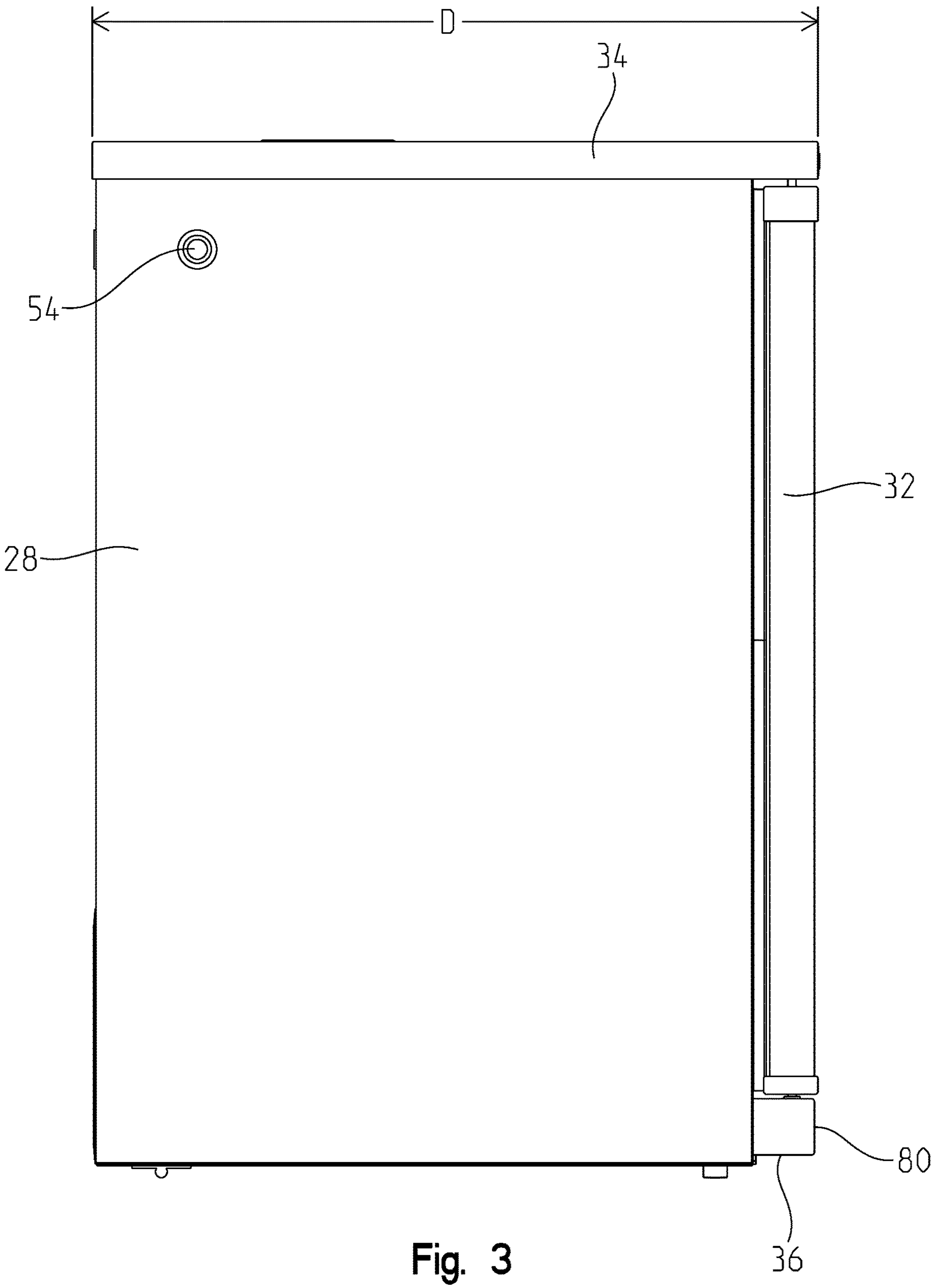
FIG. 3 is a side view of the beverage cooler.
Figure 4:
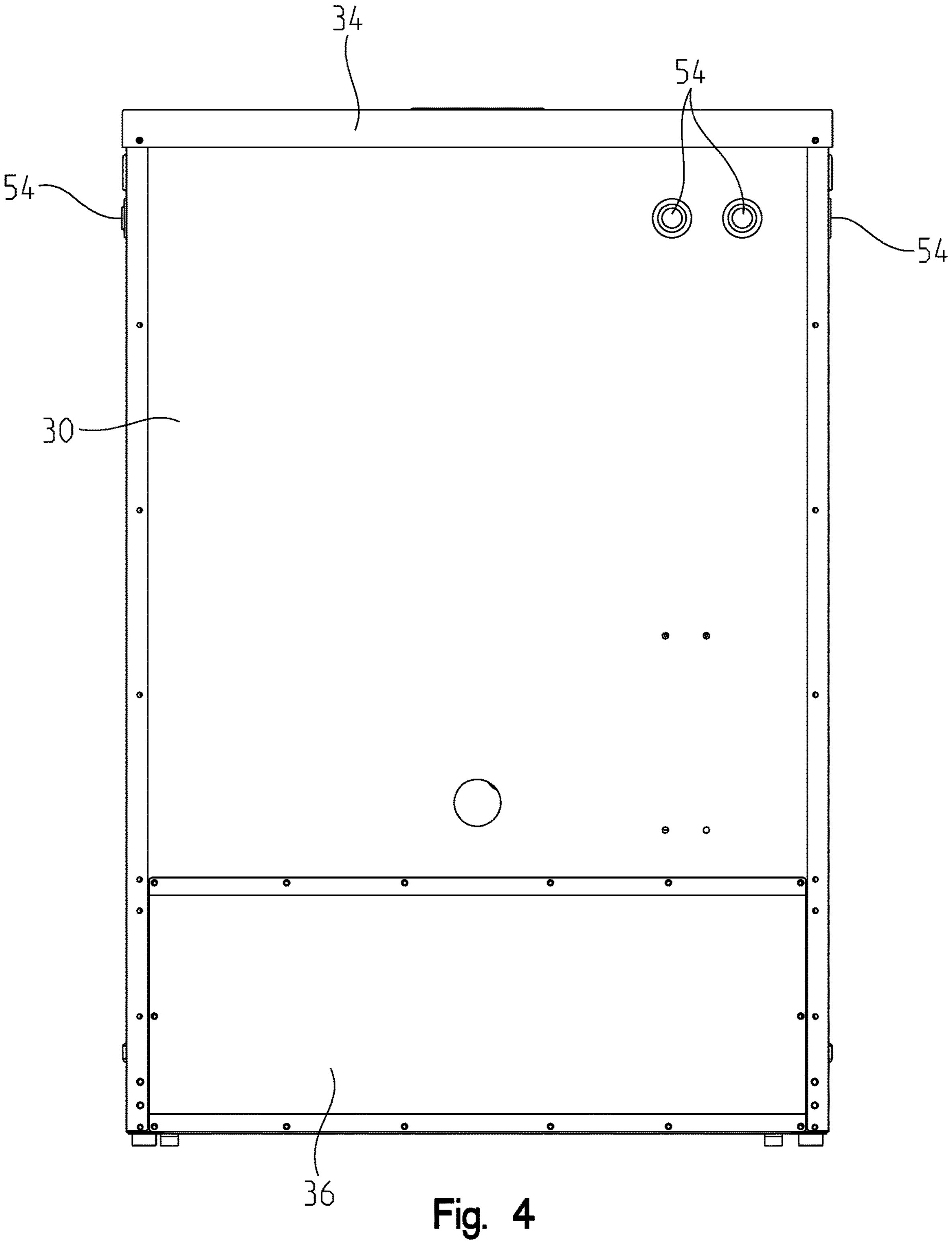
FIG. 4 is a back view of the beverage cooler.
Figure 5:
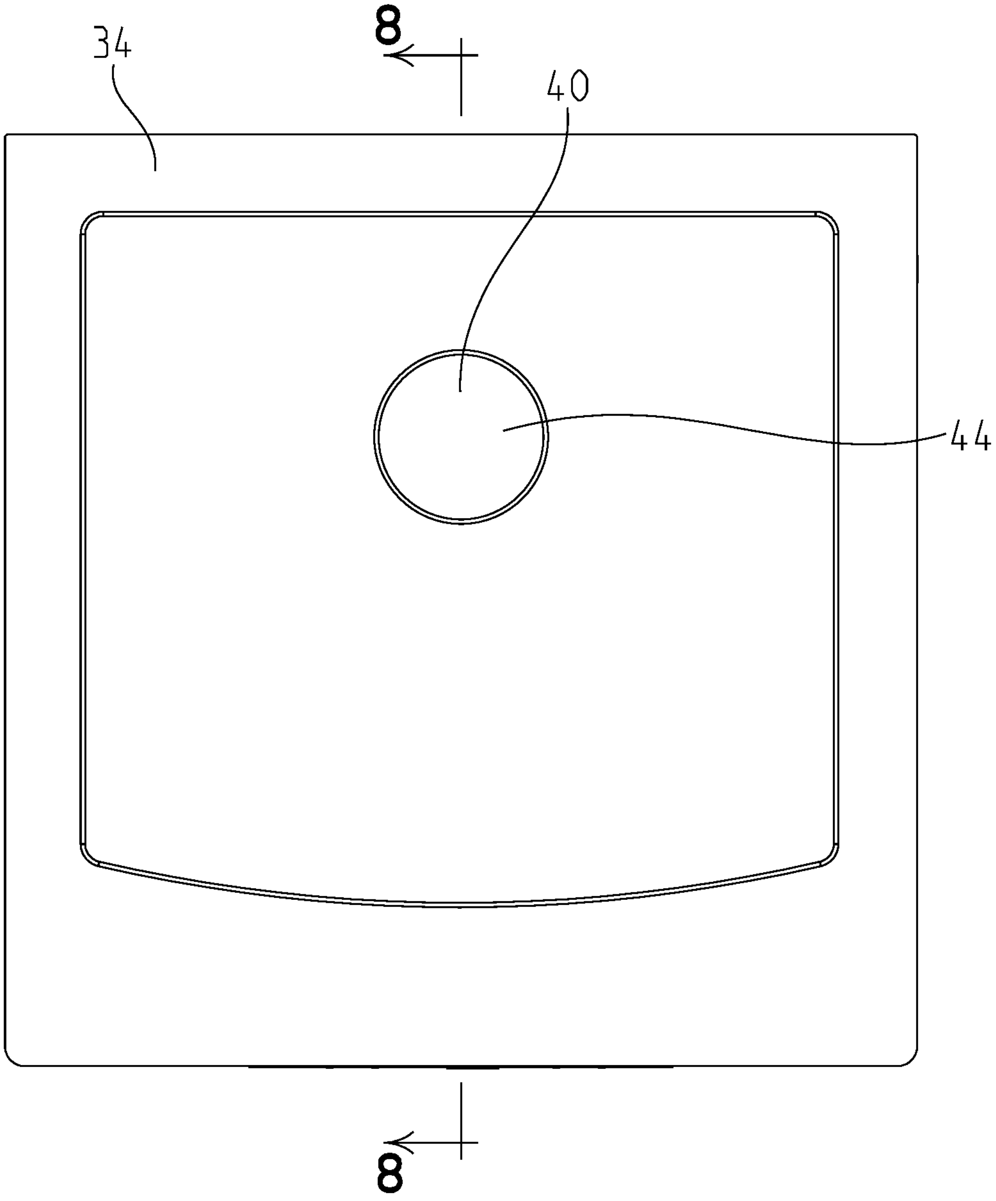
FIG. 5 is a top view of the beverage cooler.
Figure 6:
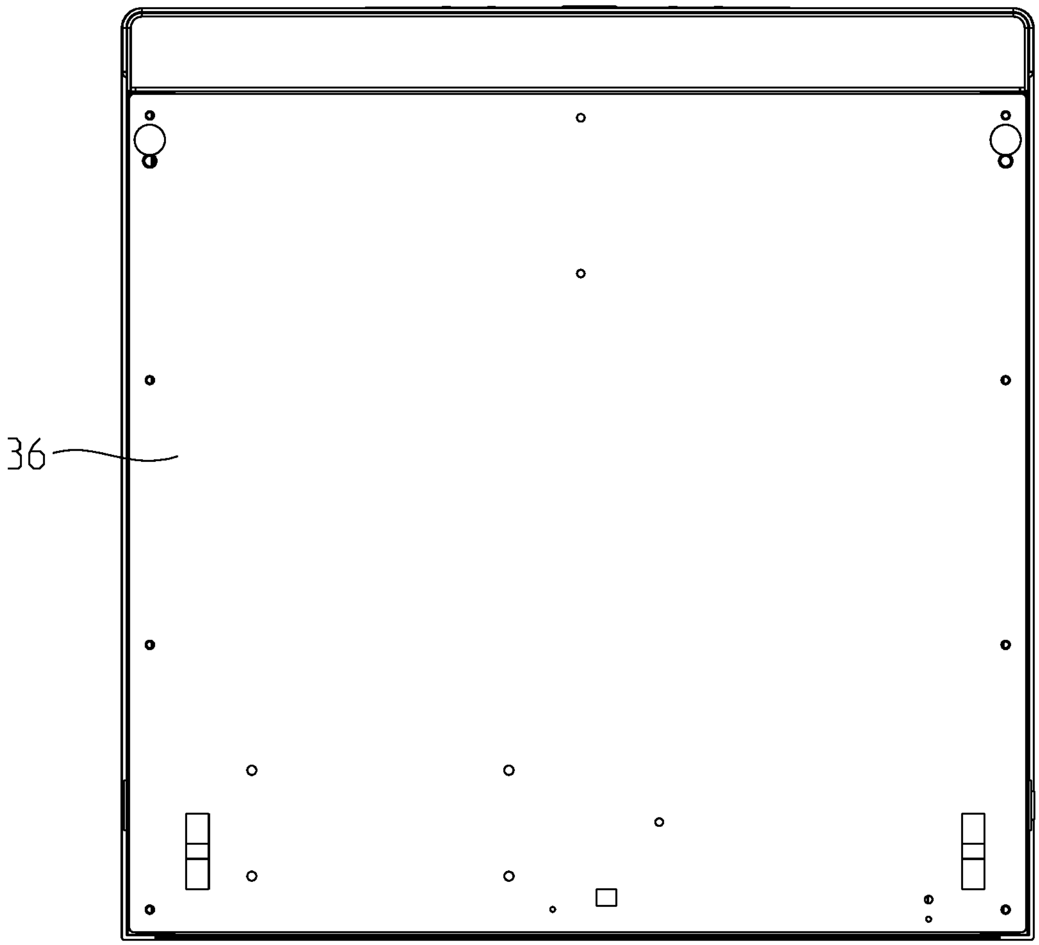
FIG. 6 is a bottom view of the beverage cooler.
Figure 7:
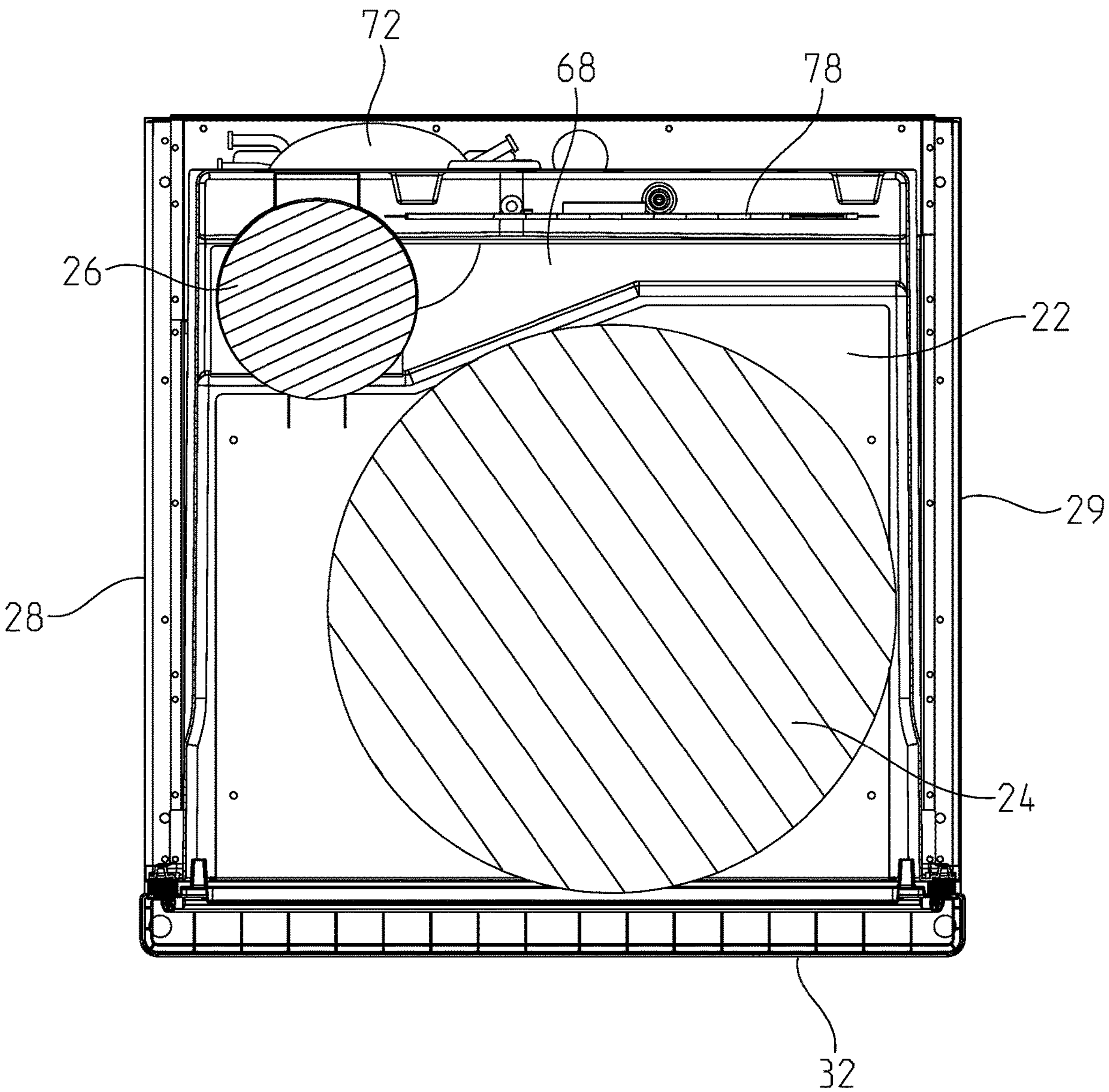
FIG. 7 is a cross sectional view taken along line 7-7 of FIG. 2.
Figure 8:
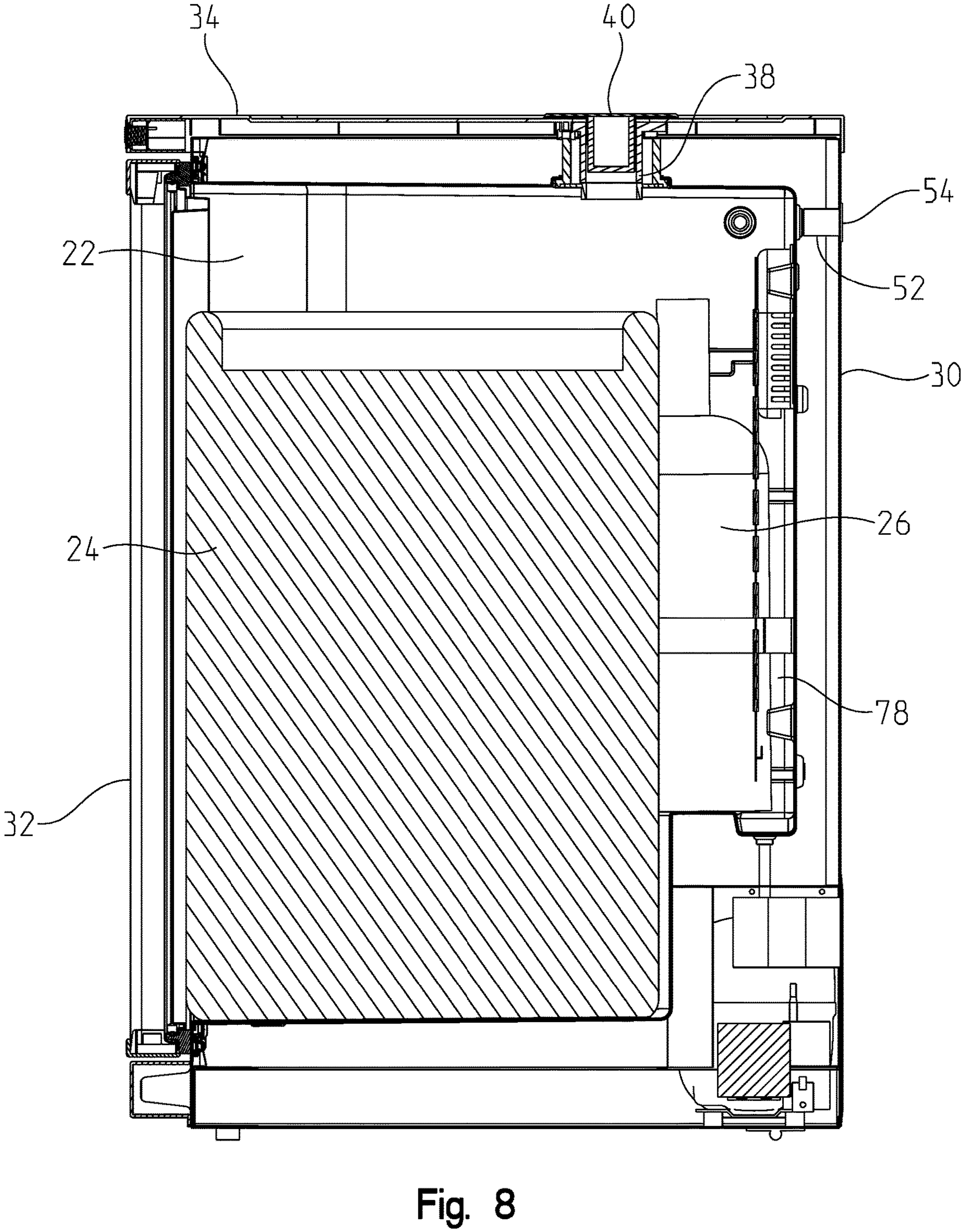
FIG. 8 is a cross sectional view taken along line 8-8 of FIG. 5.
Figure 10:
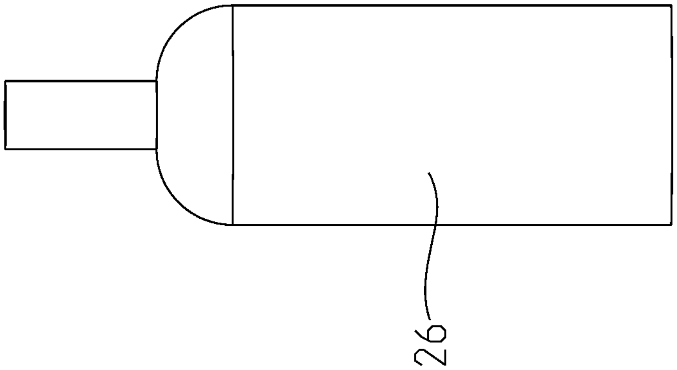
FIG. 10 is a side view of a $CO_2$ container.
Figure 9:
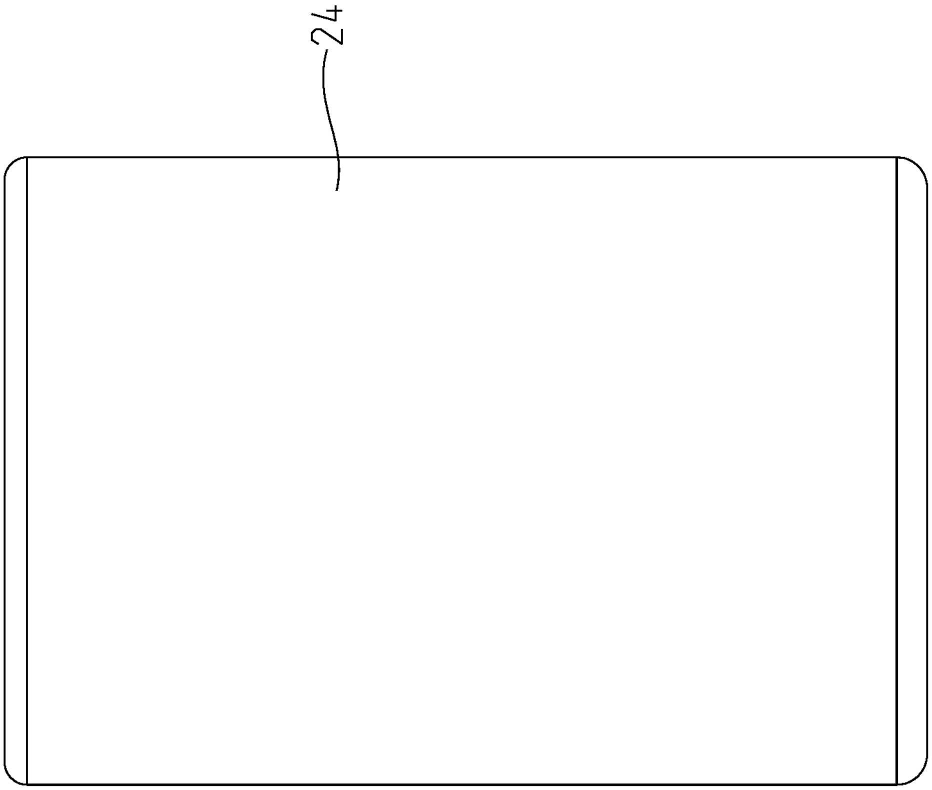
FIG. 9 is a side view of a beverage container.

Corresponding reference characters indicate corresponding parts throughout the several views. Although the exemplification set out herein illustrates embodiments of the invention, in multiple forms, the embodiments disclosed below are not intended to be exhaustive or to be construed as limiting the scope of the invention to the precise forms disclosed.

DETAILED DESCRIPTION OF THE DRAWINGS

An illustrative beverage cooler 20 is shown in FIGS. 1-8. Cooler 20 defines an interior space 22 which is adapted to hold a beverage container 24 such as a beer keg, a container for chilled coffee (e.g., for nitro coffee) or other beverage container which requires a dispensing system, such as a tap, to be connected to the container to dispense the liquid contents of the container rather than simply manually pouring the contents of the container. Interior space 22 is also configured to simultaneously hold a container for compressed gas such as $CO_2$ or nitrogen that can be coupled with the beverage container 26 and/or the dispensing system to thereby ensure a carbonated beverage or extend the storage life and quality of the beverage within the container 24.

Cooler 20 includes three sidewalls 28, 29, 30, a door 32, a top panel 34 and a bottom assembly 36 which, in the illustrated embodiment, are all thermally insulated using either foam or fibrous insulation. The sidewalls take the form of two opposing side panels 28, 29 and a back panel 30. The door 32 is pivotable about a vertical axis and is located opposite the back panel. In the illustrated embodiment, the door 32 extends the full width of the cooler. The door 32 has two recesses 33 along its top edge that function as handles. The door 32 can be mounted to swing open in either direction by selectively positioning a pair of hinges (not shown) on either the left side or right side of the opening into the interior space 22.

Figure 11:
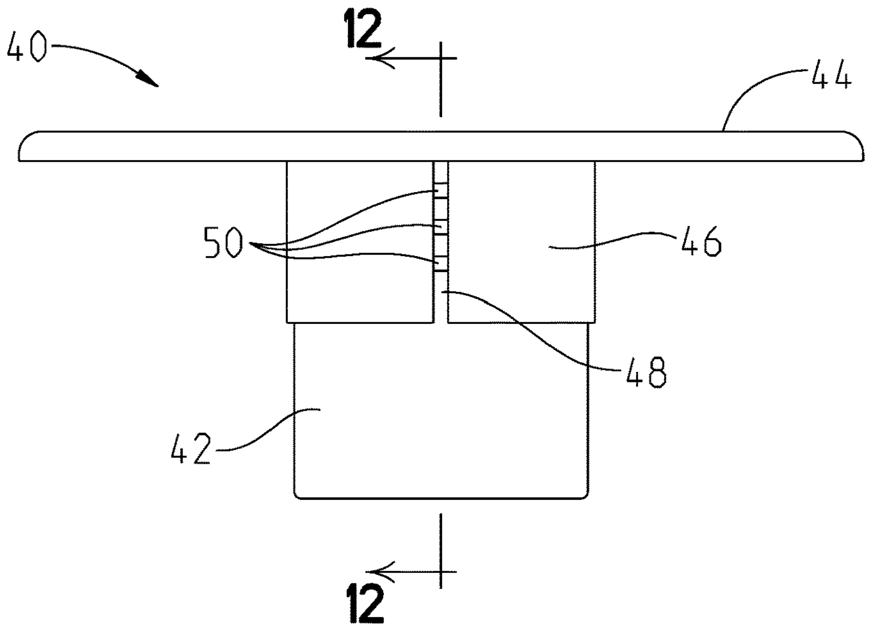
FIG. 11 is a side view of a top plug.
Figure 12:
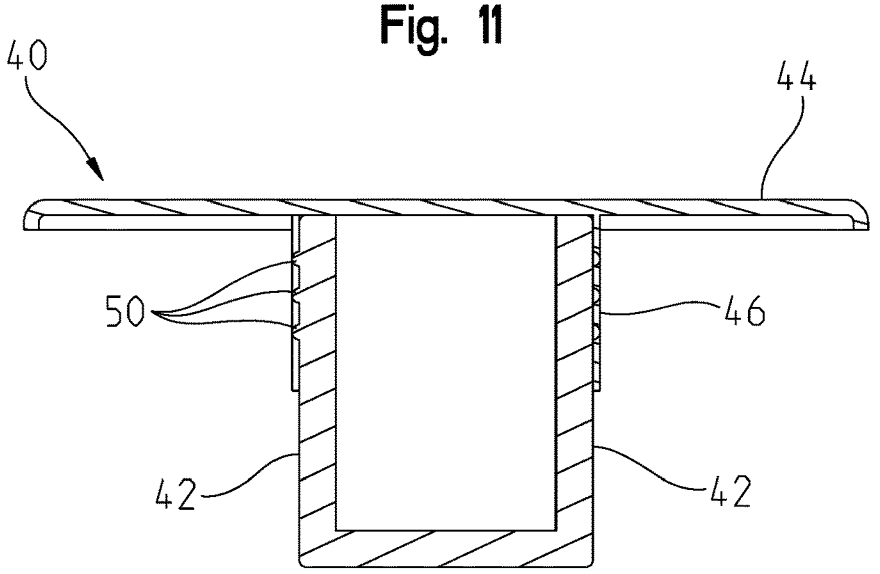
FIG. 12 is a cross sectional view taken along line 12-12 of FIG. 11.

Top panel 34 has an opening 38 therein. Mounted in opening 38 is a removable plug 40. Plug 40 is also shown in FIGS. 11 and 12. In the illustrated embodiment, plug 40 is formed out of a rubber material and includes a generally cylindrical body 42 and an upper flange 44. Body 42 is sized to fit securely within aperture 38 and upper flange 44 has a planar upper surface that defines a circle having a radius greater than both body 42 and aperture 38 whereby upper flange 44 completely covers aperture 38. In the illustrated embodiment, body 42 has a diameter of 1.57 inches (4.0 cm). Cylindrical body 42 takes the form of a hollow cylinder and has a sleeve 46 mounted thereon. An axially extending slot 48 on sleeve 46 allows sleeve 46 to expand and contract to a limited extent in a radial direction. A plurality of axially spaced ribs 50 on cylindrical body 42 circumscribe the cylindrical body and sleeve 46 is mounted on ribs 50. The ribs 50 bias sleeve 46 radially outwardly to cause sleeve 46 to engage the inner surface of aperture 38 and thereby facilitate the securement of plug 40 in aperture 38.

Removing plug 40 from aperture 38 would allow a conventional beer tap to be installed in aperture 38 to thereby provide for the dispensing of beer from a keg located within cooler 20. Installing a tap on the top of cooler 20 would allow cooler 20 to be used as a free-standing unit that could be readily repositioned. Cooler 20, however, can also be readily installed in a conventional kitchen cabinet below the countertop by placing plug 40 in aperture 38 and routing a conveyance for dispensing liquid, such as a flexible tube, through an openings in one of the sidewalls instead of through an opening in top panel 34.

In the illustrated embodiments, the cooler has exterior which defines a width W (FIG. 2) of less than 24 inches (61 cm), a front-to-back depth D (FIG. 3) of less than 25 inches (63.5 cm) and a height H (FIG. 2) of less than 35 inches (88.9 cm) to thereby fit within a standard 24 inch cabinet opening below a countertop. More specifically, in the embodiment of FIGS. 1-8, cooler 20 has a maximum exterior width of 23.74 inches (60.3 cm), a maximum exterior depth of 24.31 inches (61.7 cm) and a maximum exterior height of 34.65 inches (88 cm). The interior space of cooler 20 is configured to hold both a standard half barrel keg of beer and a standard 5 pound canister of compressed gas. More specifically, for the embodiment of FIGS. 1-8, interior space 22 has a height of 27.73 inches (70.4 cm) and will hold both a standard half barrel keg of beer with a diameter of 16.34 inches (41.5 cm) and a height of 24.02 inches (61.0 cm) and a standard 5 pound canister of compressed gas with a large/maximum diameter of 5.71 inches (14.5 cm) and a total height of 17.32 inches (44.0 cm). It is noted that wherever dimensions are referred to herein, such dimensions may also be subject to conventional manufacturing tolerances. Thus, even though a dimension may be referred to as a maximum dimension, the actual dimension may exceed the nominal maximum value by an allowable tolerance. It is also noted that dimensions shown in the drawings are in inches.

Figure 13:
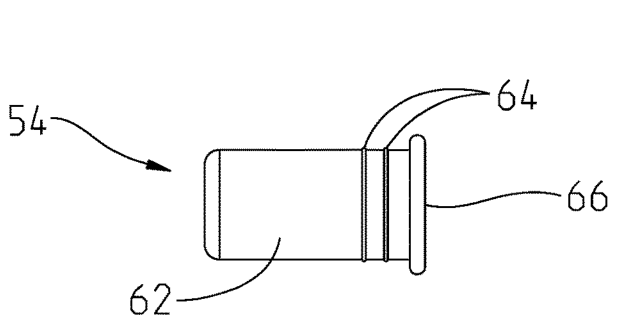
FIG. 13 is a side view of a side plug.
Figure 14:
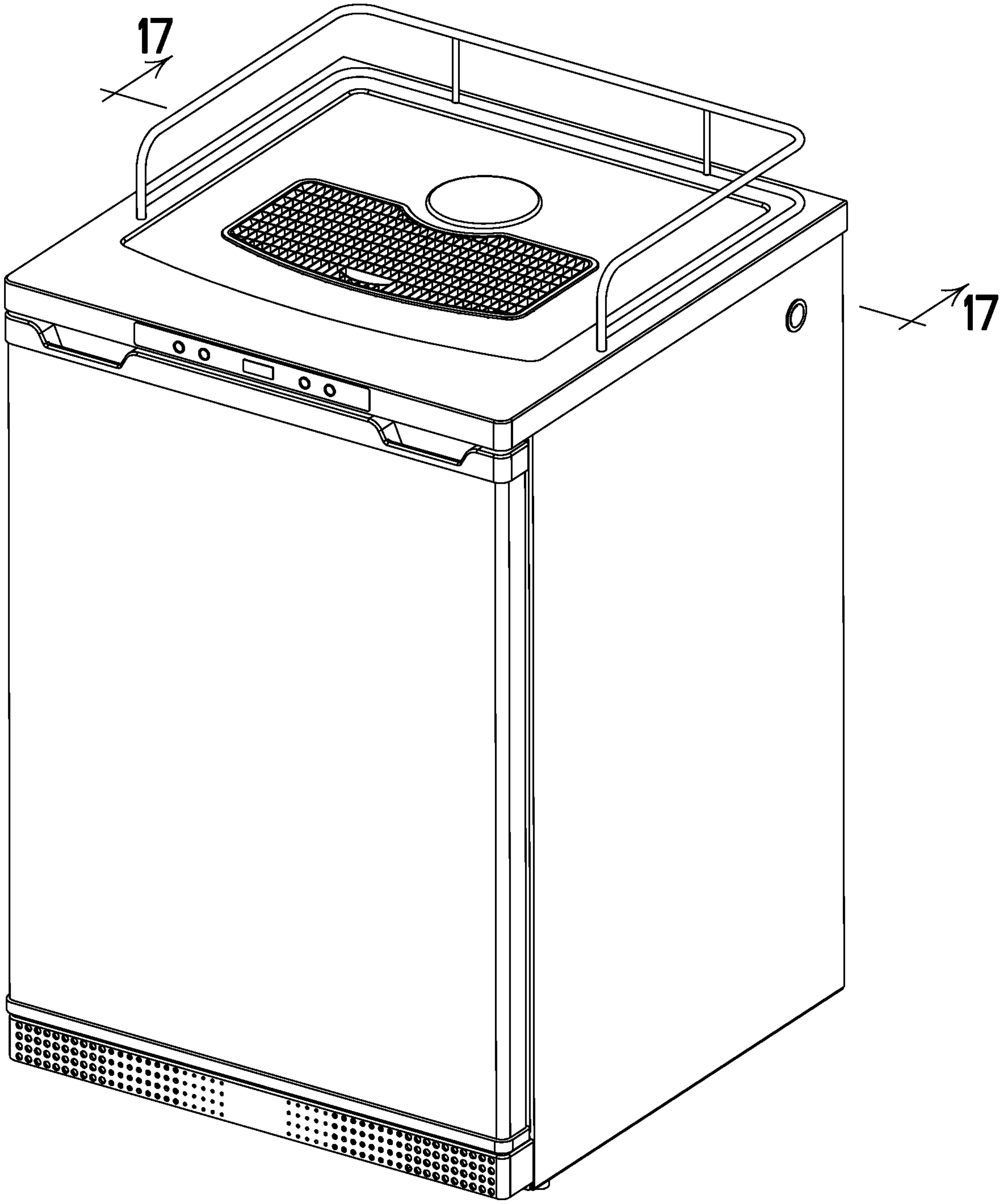
FIG. 14 is a perspective view of a second embodiment.

The sidewalls of cooler 20 also include apertures 52 which are positioned and sized to allow for the passage of a conveyance 58 connectable to the beverage container and a dispenser 60. Conveyance 58 may take the form of a plastic tube through which beer or other beverage is conveyed from beverage container 24 to a dispenser 60. Apertures 52 can also be used to route a tube or similar conveyance between a canister 26 of compressed gas and the beverage container 24. For those apertures 52 which are not being used, a plug 54 as shown in FIG. 13 can be positioned in the aperture. As can be seen in FIG. 13, plug 54 has a cylindrical body 62 with a pair of ribs 64 that extend radially outwardly from body 62 and circumscribe the cylindrical body 62. In the illustrated embodiment, cylindrical body 62 has a diameter of 0.59 inches (1.5 cm). Ribs 64 are compressed when plug 54 is installed in an aperture 52 and thereby help to seal the aperture and also secure plug 54 within aperture 52. A radially outwardly extending flange 66 is located on the exterior end of plug 54 and extends radially outwardly by a greater distance than both cylindrical body 62 and aperture 52.

Figure 25:
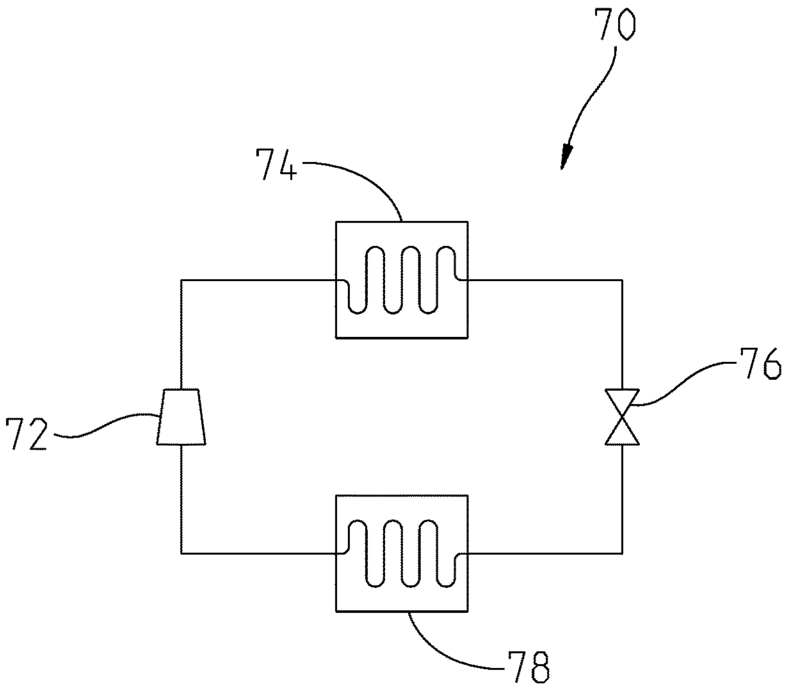
FIG. 25 is a schematic diagram of the refrigeration cycle assembly.

Interior space 22 also defines an inner shelf 68 which defines a support surface above the lower surface of interior space 22. In the illustrated embodiment, shelf 68 is located 6.97 inches (17.7 cm) above the lower surface of interior space 22. The distance or depth between closed door 32 and shelf 68 has minimum depth of 15.16 inches (38.5 cm) and a maximum depth of 17.72 inches (45.0 cm) and a variable depth transition zone. Shelf 68 can be used to support a canister 26 of compressed gas. Shelf 68 is configured to provide space for components of the refrigeration system 70 used to cool the interior of cooler 20. Refrigeration system 70 takes the form of an assembly for operating a refrigeration cycle and is schematically illustrated in FIG. 25. Refrigeration system 70 includes a compressor 72 for compressing the refrigerant circulated within system 70, a first heat exchanger 74 or condenser, an expansion valve 76 and a second heat exchanger 76 or evaporator. The compressor 72 is located below interior space 22 below shelf 68. The condenser 74 is also located below interior space. A blower, not shown, is positioned below interior space to blow air across condenser 74 and out through bottom grate 80. The evaporator 76 is located within interior space 22 along the back wall behind a thin partition to thereby cool the interior space. A thermostat or other control mechanism (not shown) is used to control the operation of refrigeration system 70 and thereby allow a user to adjustably control the temperature of interior space 22. Refrigeration system 70 is a conventional system for cooling small refrigerators and the design and operation of system 70 is well known to those having ordinary skill in the art.

Cooler 20 is configured such that it can be used with a fluid dispensing system 82 that includes a conveyance 58, such as a flexible tube, that conveys fluid from the beverage container through one of the apertures 52 in a sidewall of cooler 20 to a dispensing unit 60 located remote from the beverage cooler. In the illustrated embodiment, the dispensing unit 60 is a faucet which can selectively discharge water or the beverage contained within container 24. An example of such a dispensing system that can be used with the present disclosure is described in U.S. patent application Ser. No. 17/558,683, filed on Dec. 22, 2021 and entitled FLUID DISPENSING SYSTEMS AND METHODS (now U.S. Pat. No. 11,753,293), the disclosure of which is incorporated herein by reference.

Figure 24:
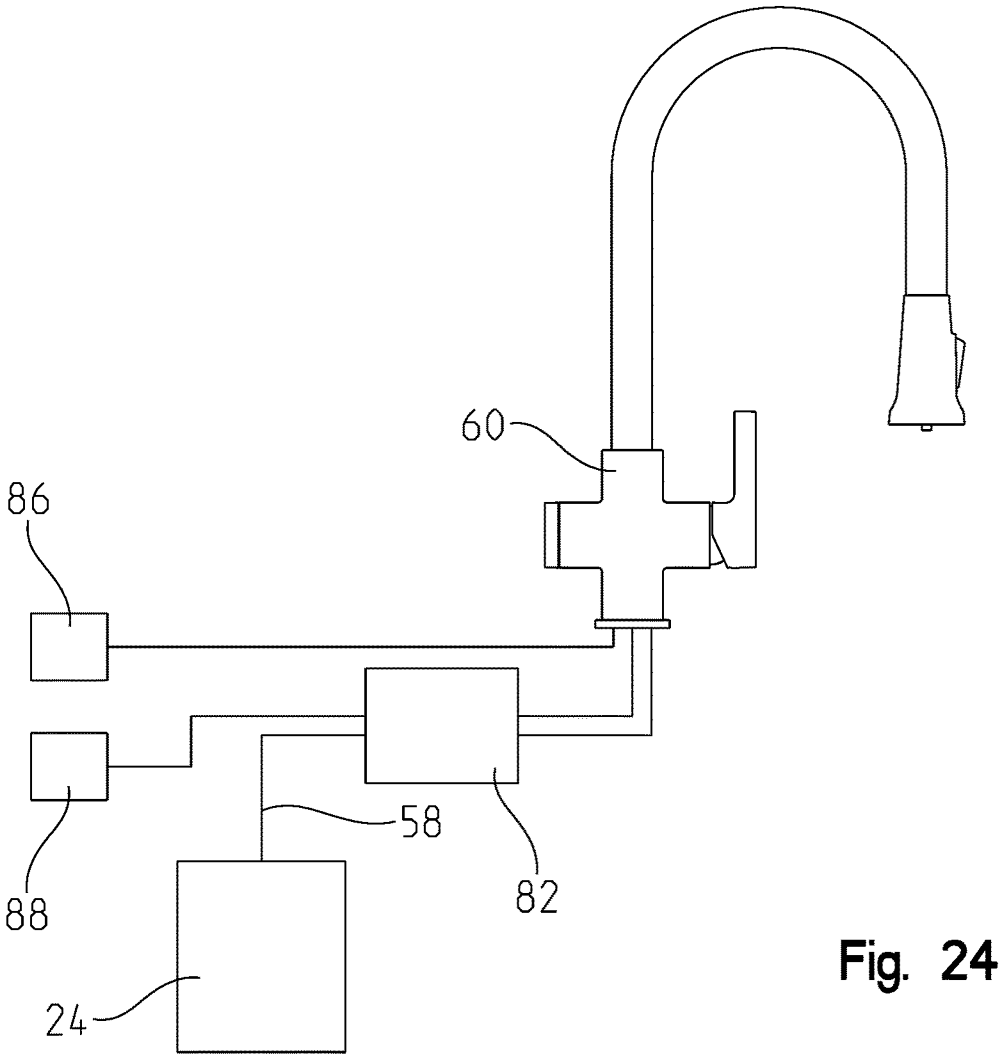
FIG. 24 is a schematic diagram of the beverage dispensing system.

As schematically depicted in FIG. 24, the exemplary fluid dispensing system 82 is connected to a cold water source 88 and beverage container 24 and a hot water source 86 is connected directly to dispensing unit 60. Fluid dispensing system 82 includes valves and pumps to allow for the selective discharge of water or a fluid from beverage container 24 through dispensing unit 60. The connection of a water supply line to fluid dispensing system 82 provides system 82 with water for flushing and cleansing of the fluid lines. System 82 may also include additional fluid inlets and outlets. For example, a mixed fluid outlet may connect to a discharge line to discharge a fluid mixture of water and beverage directly into the discharge line of the sink without passing through dispensing unit 60. Dispensing unit 60 is an electronic faucet and a communication line extends from dispensing unit 60 to fluid dispensing system 82 whereby controls on the dispensing unit 60 are in communication with the controller and allow the user to select the fluid to be dispensed. The fluid dispensing system is powered by electrical current which may be provided by a conventional electrical plug that is coupled with the buildings electrical power system.

Although cooler 20 is advantageously coupled with fluid dispensing system 82 to allow the beverage from container 24 to be dispensed from a faucet 60 positioned above a sink 90 and which can selectively discharge either water or the beverage from container 24 other arrangements employing a remote dispensing unit can be employed with cooler 20. For example, a conventional beer tap could be mounted above a sink next to a conventional water faucet with the beer tap being coupled to container 24 by a conveyance routed through an aperture 52.

Figure 26:
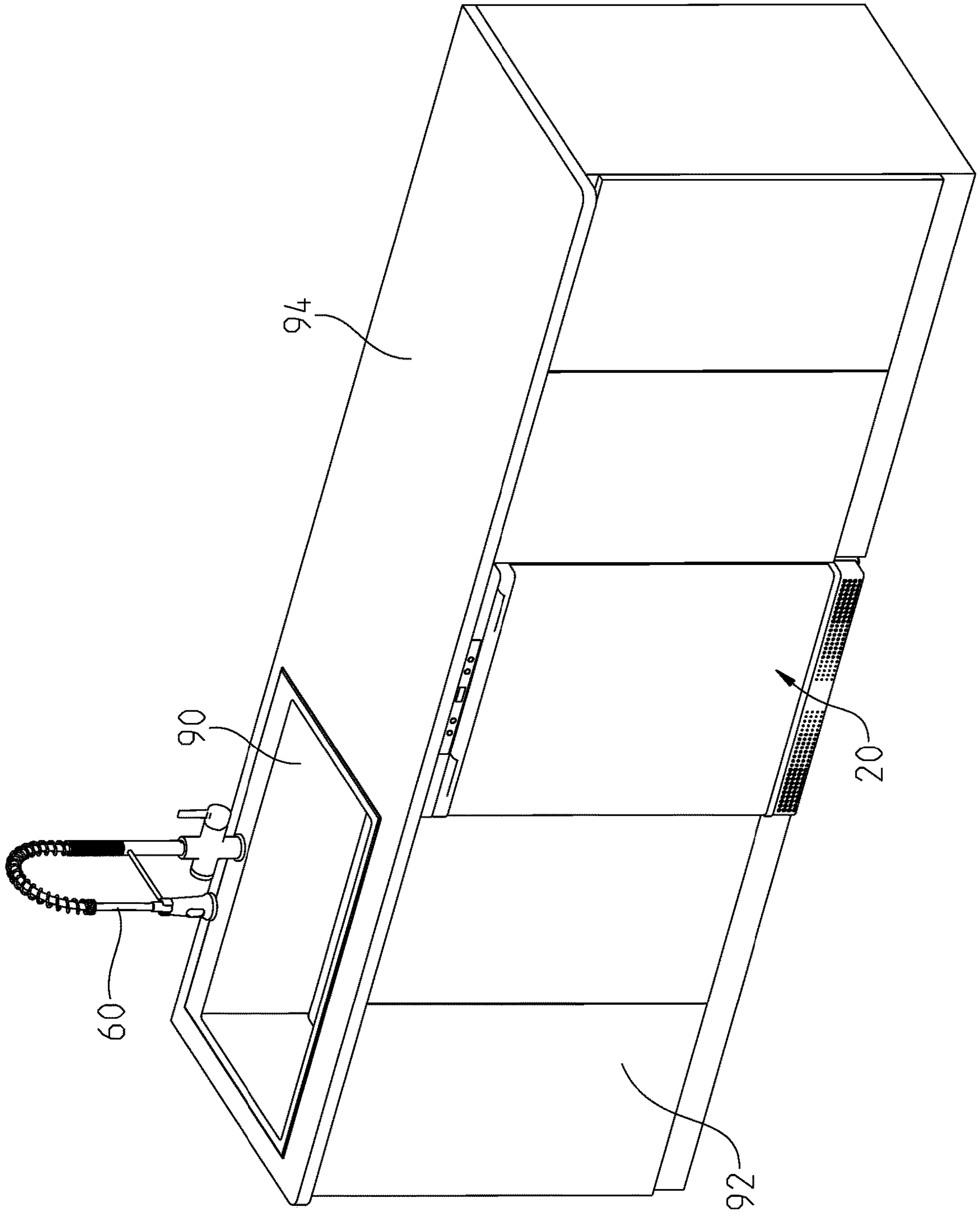
FIG. 26 is a perspective view of an installed beverage cooler.
Figure 27:
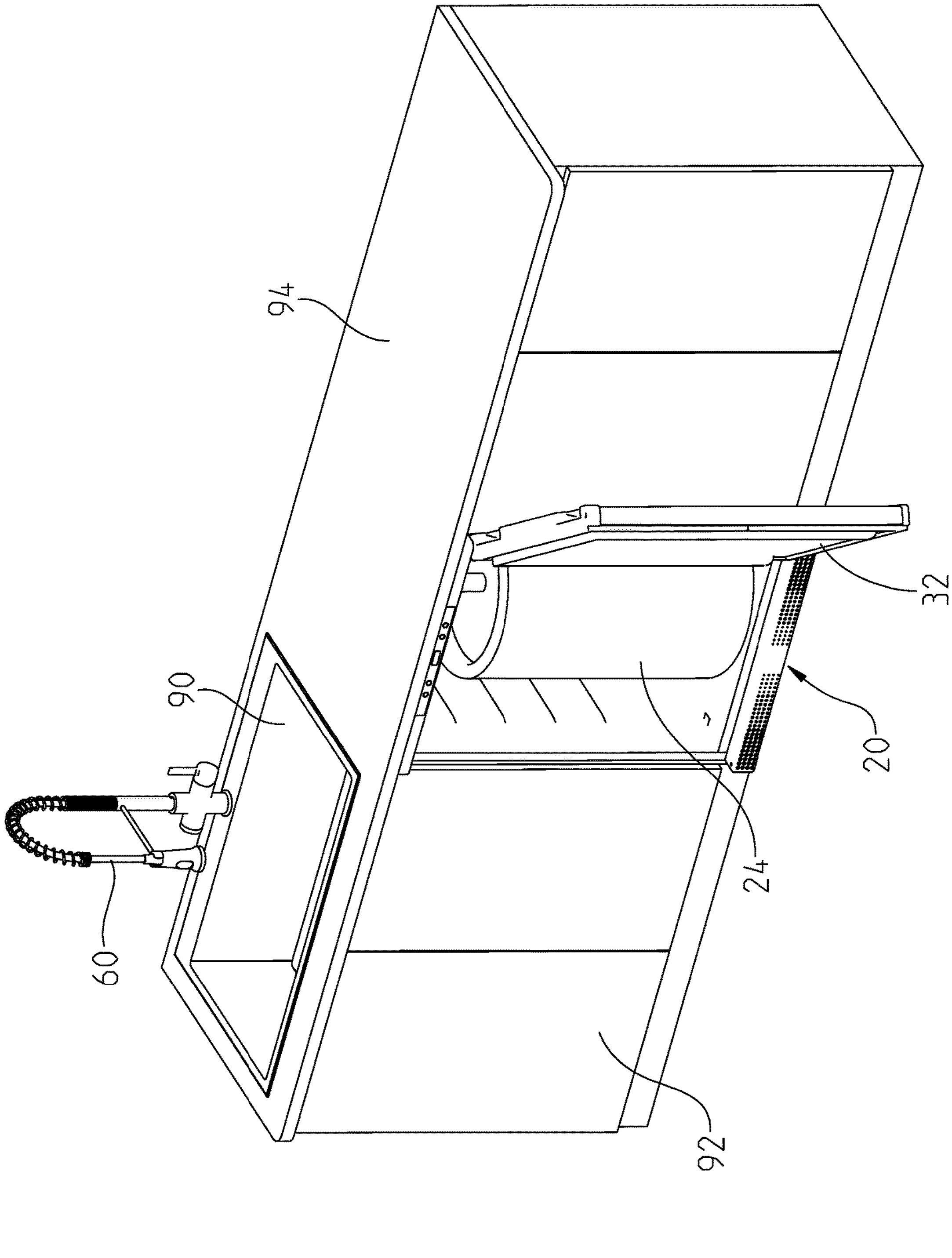
FIG. 27 is a perspective view of an installed beverage cooler with the cooler door in an open position.

FIGS. 26 and 27 illustrate cooler 20 in an installed position in cabinet structure 92 underneath countertop 94 and adjacent to sink 90 and dispensing unit 60. The remainder of the dispensing system 82 is located within cabinet structure 92 below sink 90. Typically, cabinet structures have openings for dishwashers next to sinks so that the dishwasher can be readily coupled to water supply and discharge lines and electrical power. Such a position is also highly advantageous for cooler 20. While cooler 20 could replace a dishwasher, it is also possible to install cooler 20 on one side of a sink while a dishwasher is installed on the other side of the sink. By having apertures 52 in each of the opposing side panels 28, 29, cooler 20 can be positioned on either the left or right side of sink 90 and a plug 54 can be installed in any un-used aperture, e.g., an aperture 52 on the side panel that is not adjacent the sink.

An alternative cooler 120 is shown in FIGS. 14-17. Cooler 120 is identical to cooler 20 except for top panel 122. Top panel 122 is configured to allow cooler 120 to be used as a stand alone unit or positioned under a countertop. In this regard, top panel 122 includes a spill tray 124. Spill tray 124 would be beneficial if a conventional beer tap were installed in the opening in top panel 122. A removable guard rail 126 is also shown attached to top panel 122 which helps prevent items, such as a beer mug, from being unintentionally pushed off of top panel 122 if it is used as a stand alone cooler. Guard rail 126 can be removed to allow cooler 120 to be installed in a cabinet opening below a countertop.

Figure 15:
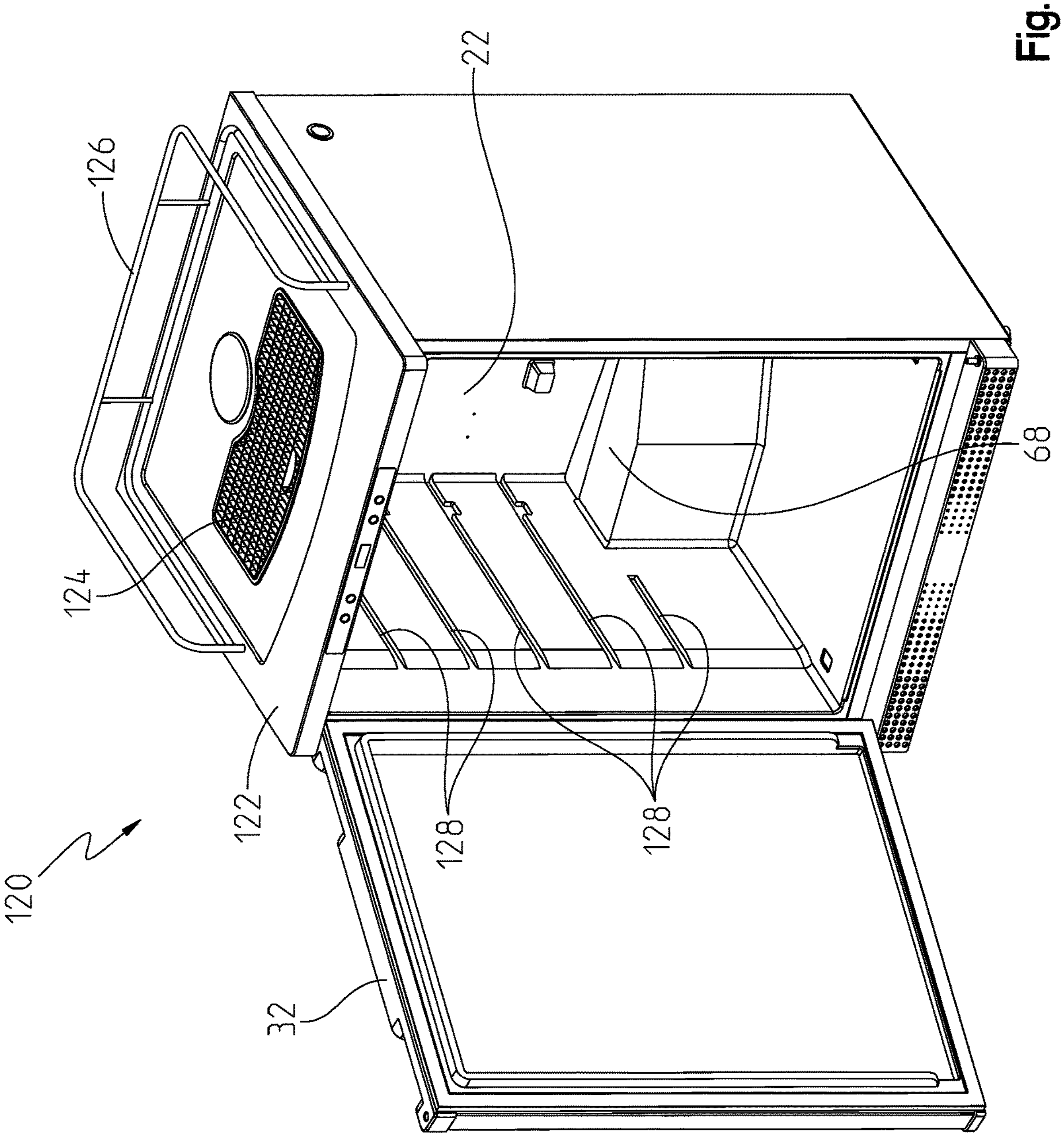
FIG. 15 is a front perspective view of the second embodiment with the door open.
Figure 16:
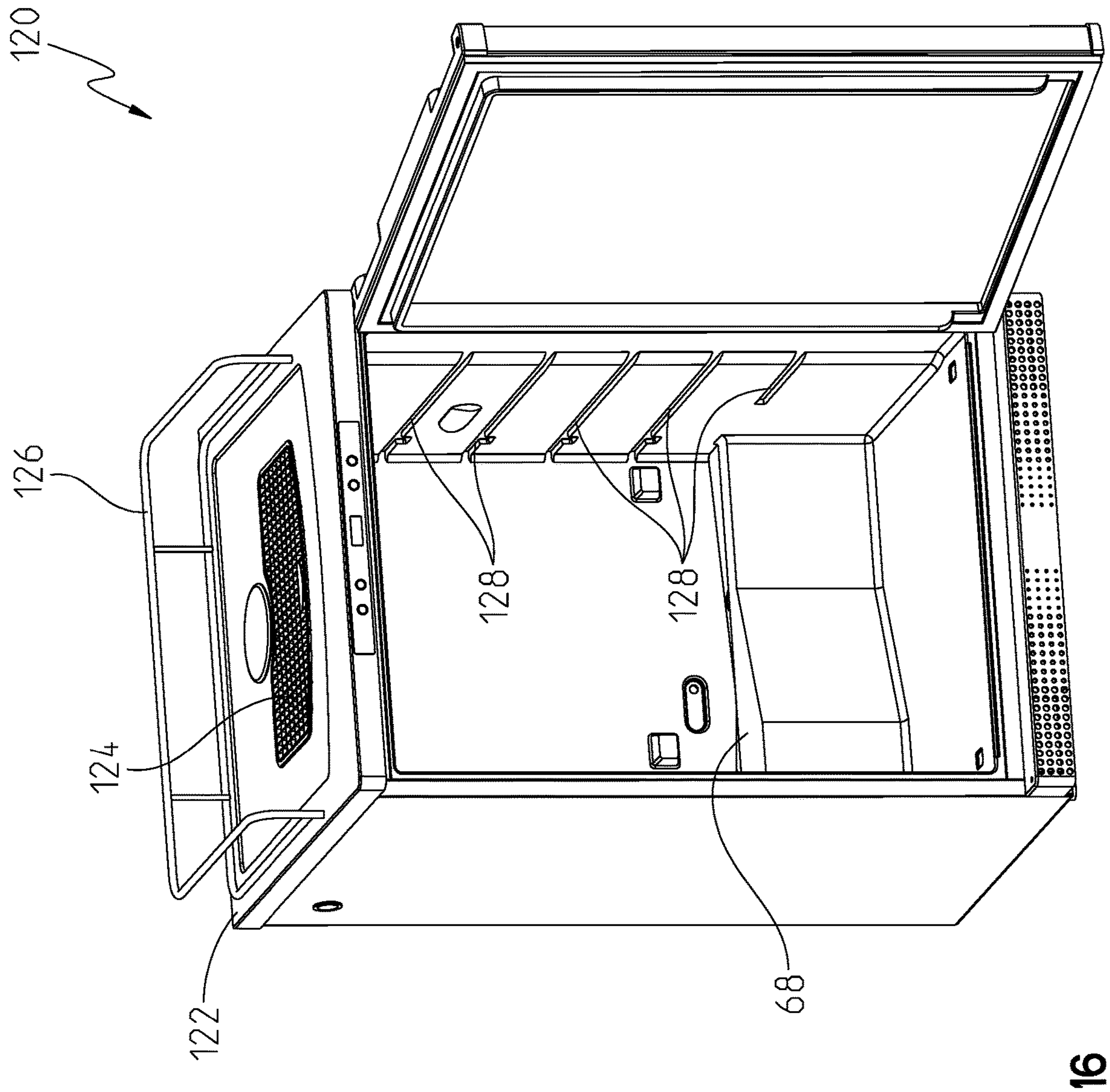
FIG. 16 is another front perspective view of the second embodiment with the door open.
Figure 17:
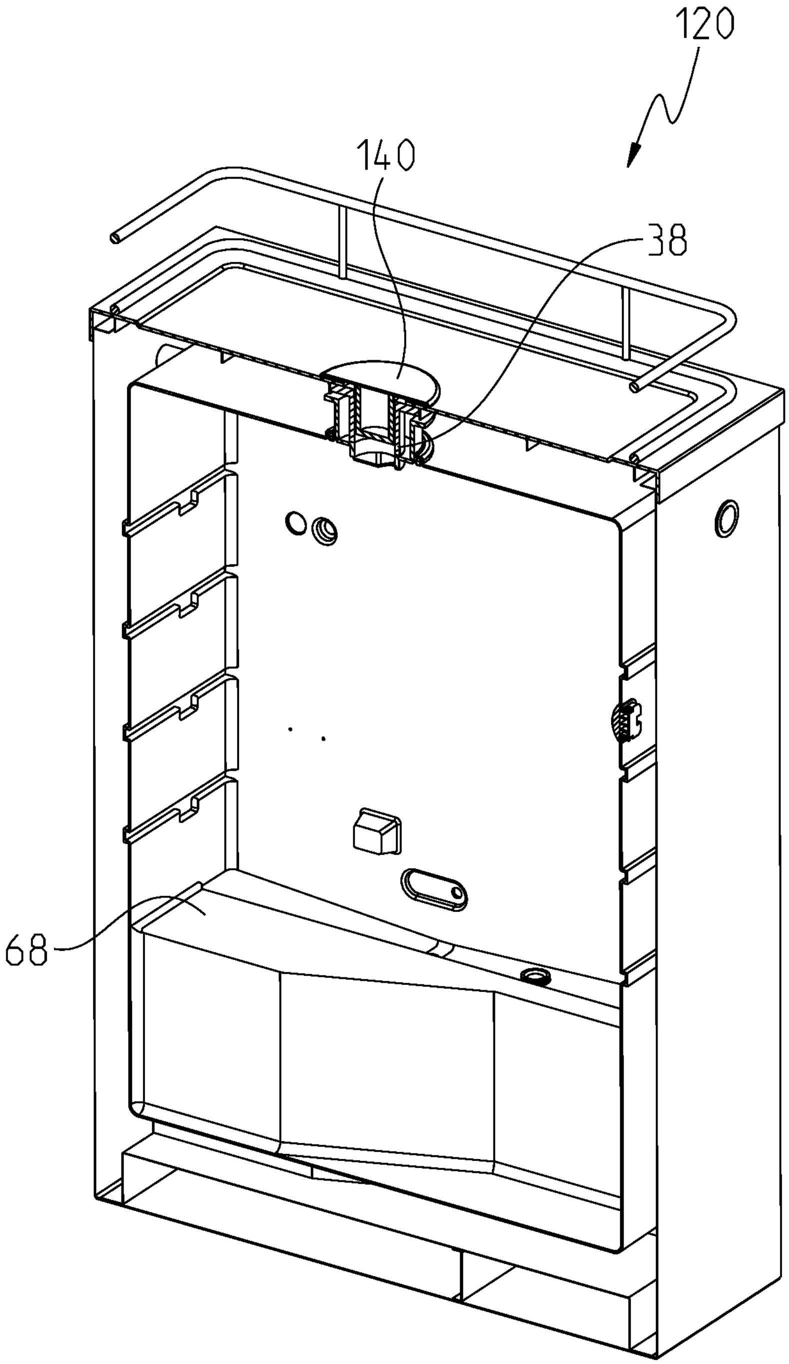
FIG. 17 is a cross sectional view of the second embodiment.
Figure 18:
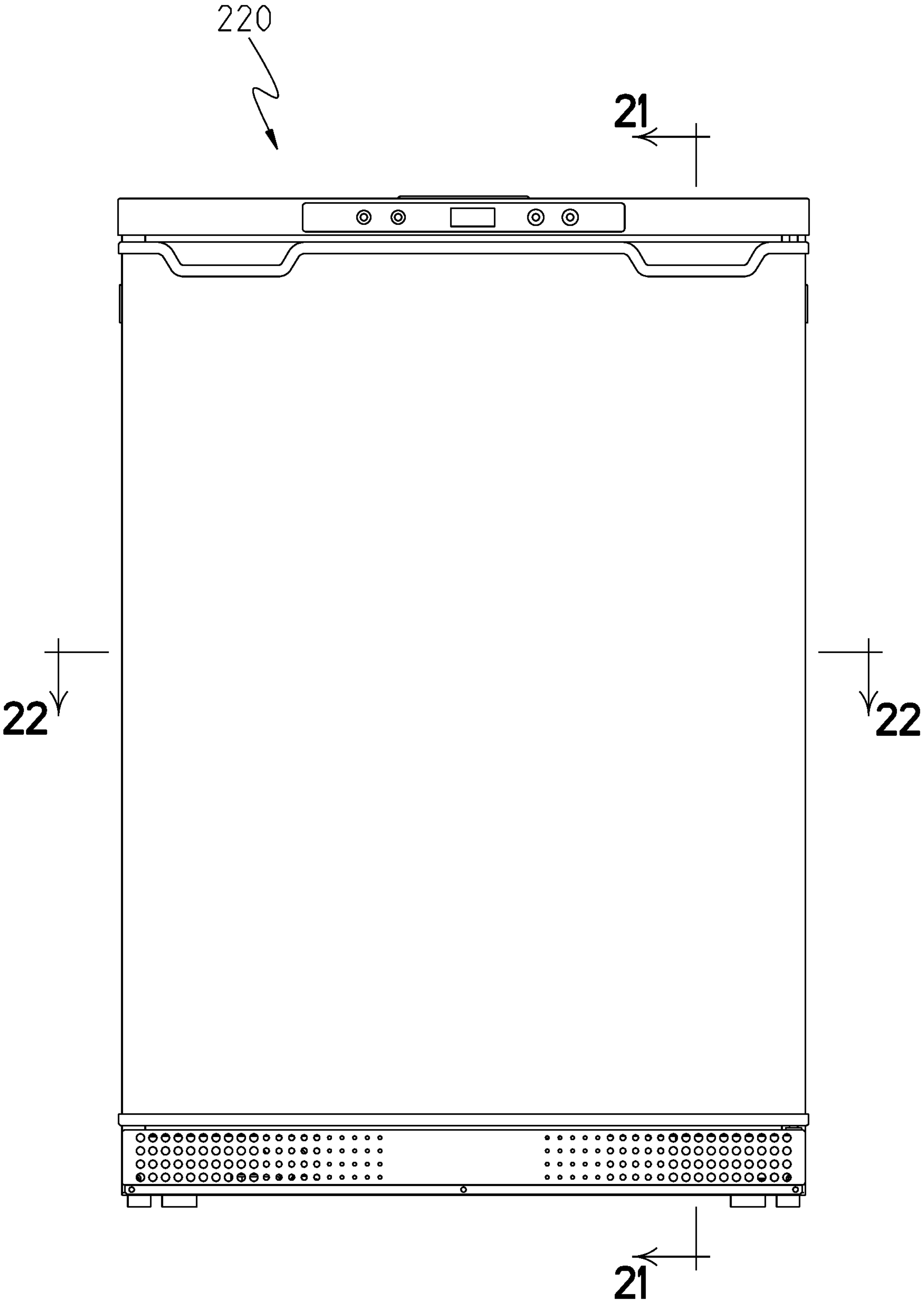
FIG. 18 is a front view of a third embodiment.
Figure 19:
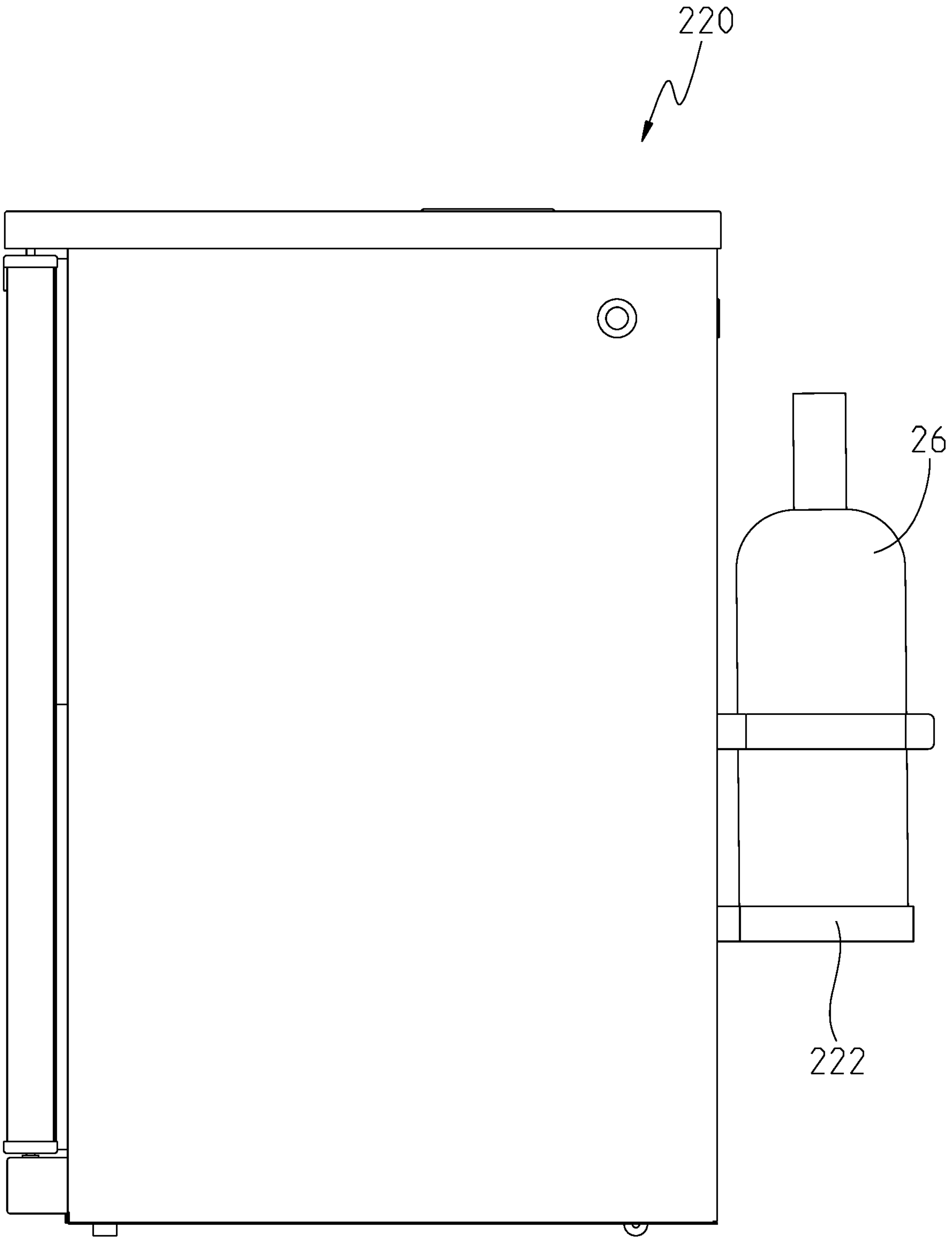
FIG. 19 is a side view of the third embodiment.
Figure 20:
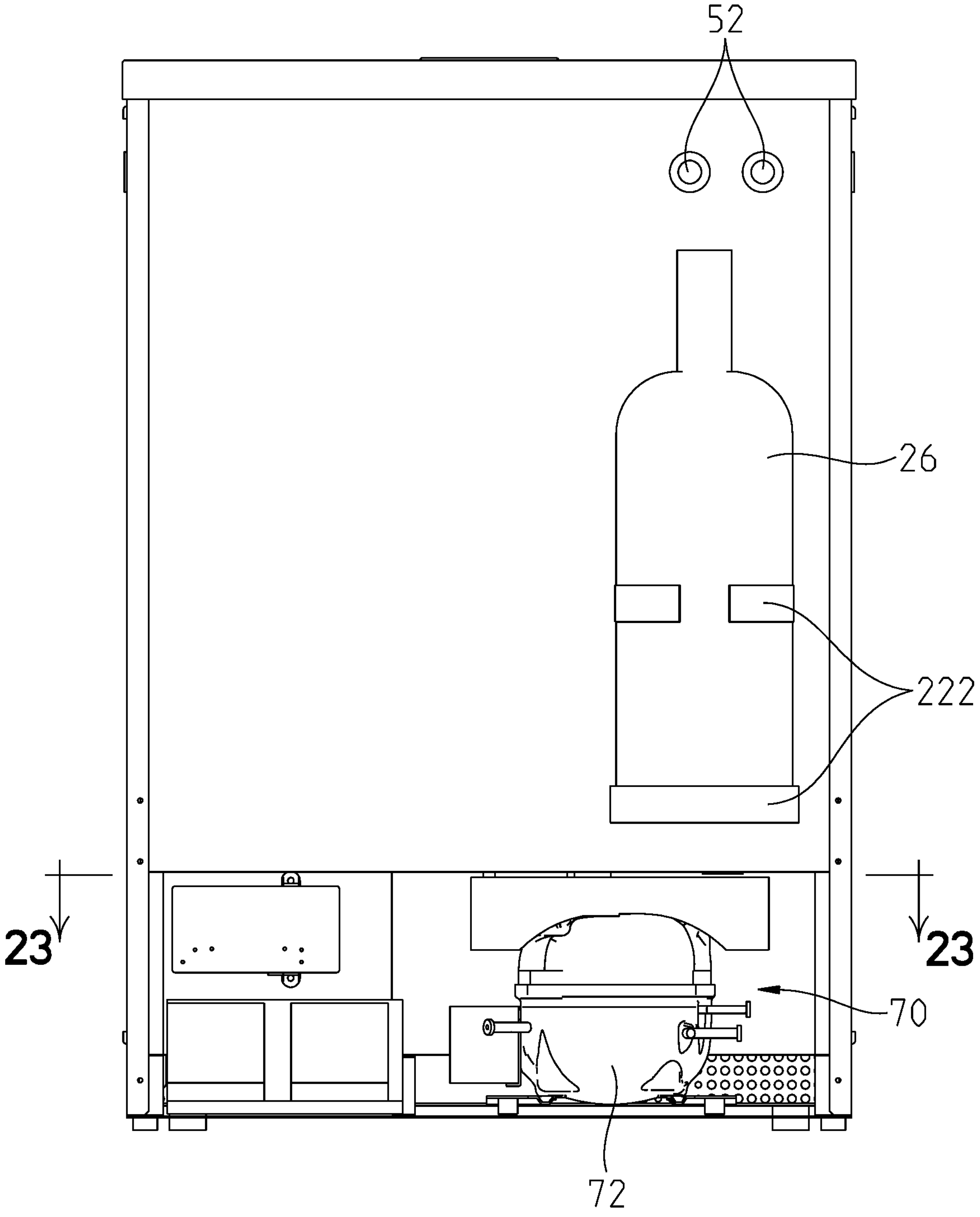
FIG. 20 is a back view of the third embodiment.
Figure 21:
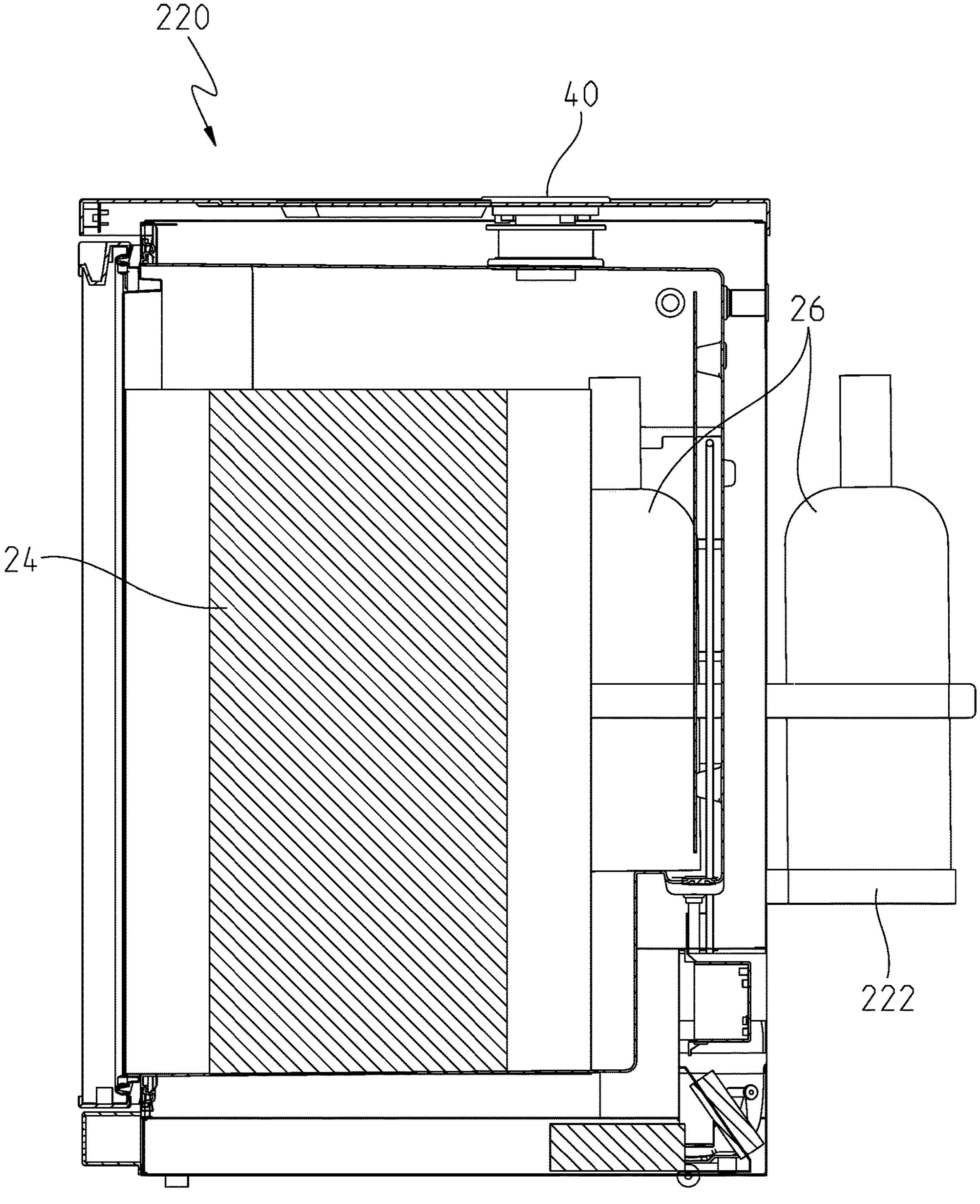
FIG. 21 is a cross sectional view taken along line 21-21 of FIG. 18.
Figure 22:
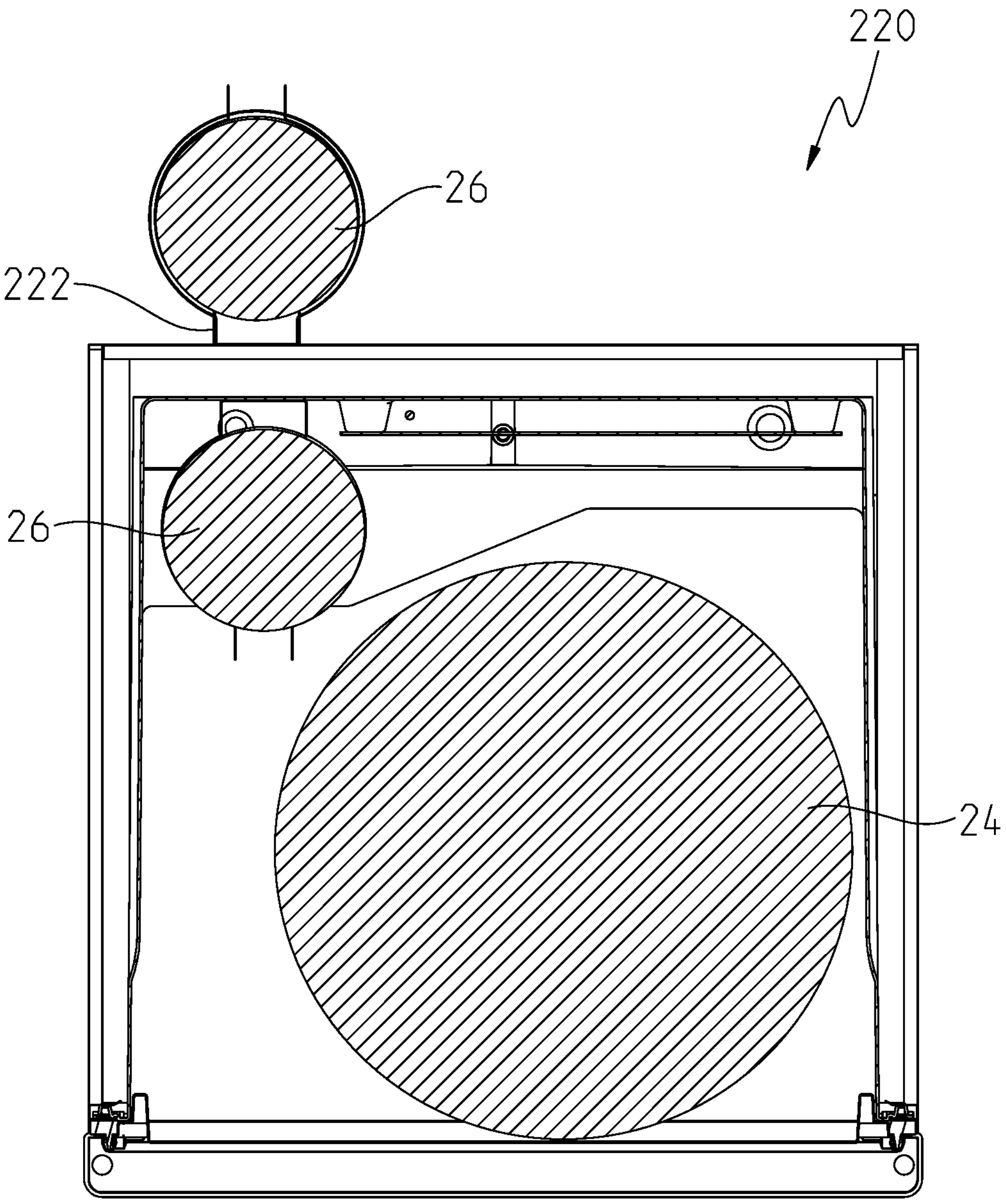
FIG. 22 is a cross sectional view taken along line 22-22 of FIG. 18.
Figure 23:
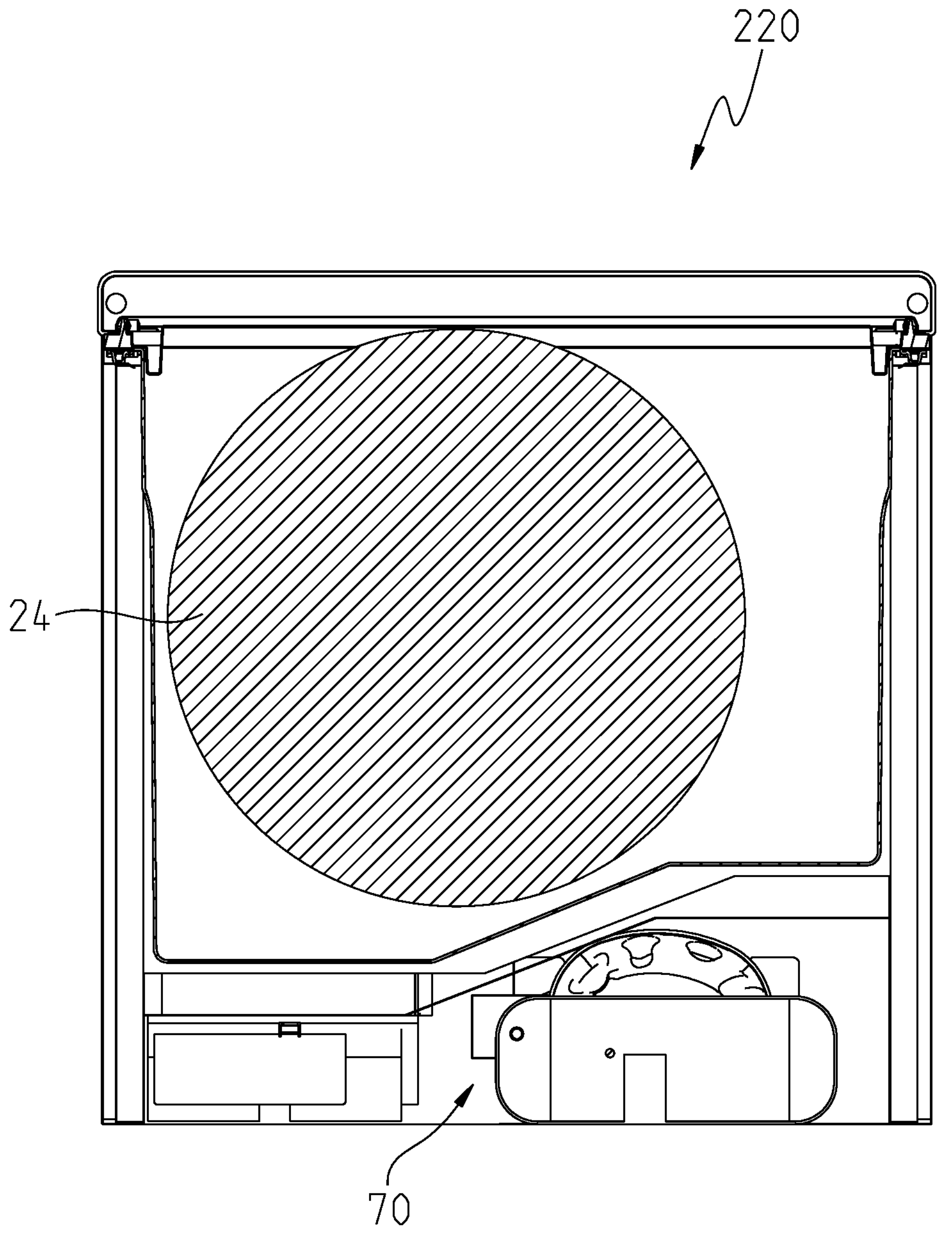
FIG. 23 is a cross sectional view taken along line 23-23 of FIG. 20.

FIGS. 15 and 16 provide a perspective view of the interior shelf 68 and also show horizontal slots 128 in the side panels which can be used to receive a slide-in wire shelf to allow cooler 120 to be used as a conventional refrigerator or with smaller beverage containers that do not take up the entire height of the cooler.

FIGS. 18-23 illustrate a third embodiment. Cooler 220 shown in FIGS. 18-23 is similar to cooler 20 with the exception that cooler 220 includes an exterior support 222 for supporting a compressed gas container 26 outside the cooler 220. An aperture 52 in one of the sidewalls is located proximate the exterior support so that a tube can be used to convey compressed gas from a canister on the exterior support to the interior of the cooler where it can be coupled with the beverage container.

While this invention has been described as having an exemplary design, the present invention may be further modified within the spirit and scope of this disclosure. This application is therefore intended to cover any variations, uses, or adaptations of the invention using its general principles.

What is claimed is:

1. A beverage cooler comprising:

a housing defining an interior space adapted to hold a beverage container, the housing including at least one sidewall panel, a door and a top panel;

a refrigeration system for cooling the interior space of the housing;

wherein the top panel includes an opening having a removable plug mounted therein, the removable plug comprising a cylindrical body having a sleeve mounted thereon wherein the sleeve includes an axially extending slot whereby the sleeve is expandable and contractable in a radial direction;

at least one opening in the at least one sidewall panel for receiving a conveyance therethrough whereby the conveyance is connectable to the beverage container and a dispensing unit located remote from the beverage cooler.

2. The beverage cooler of claim 1 wherein the refrigeration system comprises an assembly for operating a refrigeration cycle to cool the interior space.

3. The beverage cooler of claim 2 wherein the assembly for operating a refrigeration cycle includes a compressor, a condenser heat exchanger, an expansion valve and an evaporator heat exchanger.

4. The beverage cooler of claim 1 wherein the housing is thermally insulated.

5. The beverage cooler of claim 4 wherein the at least one sidewall panel comprises three sidewall panels.

6. The beverage cooler of claim 5 wherein the sidewall panels include a plurality of apertures and at least one of the apertures has a second removable plug mounted therein.

7. The beverage cooler of claim 1 wherein the housing is adapted to be installed under a countertop adjacent to a sink.

8. The beverage cooler of claim 7 further comprising a fluid dispensing system adapted to connect the beverage container within the interior space with a fluid dispenser mounted proximate the sink.

9. The beverage cooler of claim 8 wherein the fluid dispenser can selectively dispense water or a beverage from the beverage container.

10. The beverage cooler of claim 1 wherein the beverage container is a beer keg and the interior space is adapted to house a compressed gas container.

11. The beverage cooler of claim 1 wherein the cooler includes an exterior support for supporting a compressed gas container outside the cooler and the at least one sidewall panel includes an aperture proximate the exterior support for routing a tube from the compressed gas container to the interior of the cooler.

12. The beverage cooler of claim 1 wherein the exterior dimensions of the cooler define a width of less than 24 inches (61 cm), a front-to-back depth of less than 25 inches (63.5 cm) and a height of less than 35 inches (88.9 cm).

13. The beverage cooler of claim 12 wherein the at least one sidewall panel comprises three sidewall panels, which define a pair of opposite side panels and a back panel wherein the width of the cooler is defined by the two opposite side panels and the depth is defined by the door in a closed position and the back panel.

14. The beverage cooler of claim 1 wherein a plurality of axially spaced ribs are disposed on the cylindrical body and the sleeve is mounted on the plurality of axially spaced ribs whereby the plurality of axially spaced ribs bias the sleeve radially outwardly.

15. A beverage cooler comprising:

a thermally insulated housing defining an interior space adapted to hold a beverage container, the thermally insulated housing including three sidewall panels, a door and a top panel, the three sidewall panels defining a pair of opposite side panels and a back panel;

a refrigeration system for cooling the interior space of the housing, the refrigeration system including an assembly for operating a refrigeration cycle to cool the interior space;

at least one opening in each of the opposite side panels adapted to receive a conveyance therethrough whereby the conveyance is connectable to the beverage container and a dispensing unit located remote from the beverage cooler;

at least one removable plug mounted in the at least one opening of at least one of the opposite side panels, the at least one removable plug comprising a cylindrical body with a plurality of ribs extending radially outwardly from the cylindrical body and circumscribing the cylindrical body and a radially outwardly extending flange disposed on one end of the removable plug; and a fluid dispensing system adapted to connect the beverage container within the interior space with the dispensing unit, wherein the dispensing unit can selectively dispense water or a beverage from the beverage container.

16. The beverage cooler of claim 15 wherein the dispensing unit is an electronic faucet.

17. The beverage cooler of claim 16 wherein the electronic faucet is in communication with a controller, the controller in communication with at least one valve of the fluid dispensing system, and a user input to the electronic faucet selects the fluid to be dispensed from the electronic faucet.

18. The beverage cooler of claim 15 wherein the housing is adapted to be installed under a countertop adjacent to a sink.

19. The beverage cooler of claim 15 wherein the top panel is a solid panel without any openings therethrough.

20. The beverage cooler of claim 15 wherein the top panel includes an opening having a second removable plug mounted therein, the second removable plug comprising a second cylindrical body having a sleeve mounted thereon wherein the sleeve includes an axially extending slot whereby the sleeve is expandable and contractable in a radial direction.

21. The beverage cooler of claim 20 wherein a plurality of axially spaced ribs are disposed on the second cylindrical body and the sleeve is mounted on the plurality of axially spaced ribs whereby the plurality of axially spaced ribs bias the sleeve radially outwardly.

* * * * *